(12) United States Patent
Hebbale et al.

(10) Patent No.: US 11,660,500 B2
(45) Date of Patent: May 30, 2023

(54) SYSTEM AND METHOD FOR A SPORTS-COACHING PLATFORM

(71) Applicant: Skillteck Inc., Pleasanton, CA (US)

(72) Inventors: Anand Rangegowda Hebbale, Pleasanton, CA (US); Bibin Sebastian, Calicut (IN); Chandrashekara Hebbale Range Gowda, Bengaluru (IN)

(73) Assignee: SKILLTECK INC., Pleasanton, CA (US)

( * ) Notice: Subject to any disclaimer, the term of this patent is extended or adjusted under 35 U.S.C. 154(b) by 89 days.

(21) Appl. No.: 17/196,524

(22) Filed: Mar. 9, 2021

(65) Prior Publication Data
US 2022/0288451 A1   Sep. 15, 2022

(51) Int. Cl.
| | | |
|---|---|---|
| G09G 5/02 | (2006.01) | |
| A63B 24/00 | (2006.01) | |
| G06T 11/20 | (2006.01) | |
| G06T 7/246 | (2017.01) | |
| G06T 11/00 | (2006.01) | |
| A63B 71/06 | (2006.01) | |
| A63B 69/00 | (2006.01) | |
| G06T 7/73 | (2017.01) | |

(52) U.S. Cl.
CPC ...... *A63B 24/0006* (2013.01); *A63B 69/0071* (2013.01); *A63B 71/0622* (2013.01); *G06T 7/248* (2017.01); *G06T 7/73* (2017.01); *G06T 11/001* (2013.01); *G06T 11/203* (2013.01); *A63B 2024/0012* (2013.01); *A63B 2071/0647* (2013.01); *A63B 2220/05* (2013.01); *A63B 2220/806* (2013.01); *A63B 2220/807* (2013.01); *A63B 2225/20* (2013.01); *G06T 2200/24* (2013.01); *G06T 2207/10016* (2013.01); *G06T 2207/10032* (2013.01); *G06T 2207/30196* (2013.01); *G06T 2207/30221* (2013.01)

(58) Field of Classification Search
CPC .... G09G 5/02; G09G 5/06; G09G 2320/0666; G09G 2340/06; G09T 11/001
USPC .................................................. 345/589
See application file for complete search history.

(56) References Cited

U.S. PATENT DOCUMENTS

| | | |
|---|---|---|
| 7,539,533 B2 | 5/2009 | Tran |
| 8,108,036 B2 | 1/2012 | Tran |
| 9,792,479 B2 | 10/2017 | Mallet et al. |
| 10,284,794 B1 | 5/2019 | Francois et al. |

(Continued)

*Primary Examiner* — Gordon G Liu
(74) *Attorney, Agent, or Firm* — Patent Ventures, LLC

(57) ABSTRACT

A system and method is disclosed for a surround-perspective motion annotation comprising: an image/video input for capturing and/or parsing into at least one image frame of a subject performing at least one motion from each of at least three perspectives; a vector generating module for generating a test vector or wire mesh corresponding to a pose of the subject in each of the captured/parsed frame from each of the perspectives; and an annotation module for inputting a drawing imposed on the test vector/mesh for a visual contrast against any one of a feature from the test vector/mesh from any one of the perspectives. Further disclosed embodiments include for a system and method for generating multi-perspective, color-coded deviations of a subject from a reference (color wheel). Further embodiments include for a system and method for generating an optimal motion signature (OMS) for the subject based on his or her generated color wheel.

19 Claims, 22 Drawing Sheets

(56) References Cited

U.S. PATENT DOCUMENTS

| | | |
|---|---|---|
| 10,417,818 B2 | 9/2019 | Loper et al. |
| 2016/0199693 A1* | 7/2016 | Vermilyea ............ A61B 5/1122 |
| | | 700/91 |
| 2020/0251213 A1* | 8/2020 | Tran ........................ G06N 20/00 |
| 2021/0227195 A1* | 7/2021 | Holzer ............... H04N 5/23238 |
| 2022/0207770 A1* | 6/2022 | Liu ......................... G06T 17/20 |

* cited by examiner

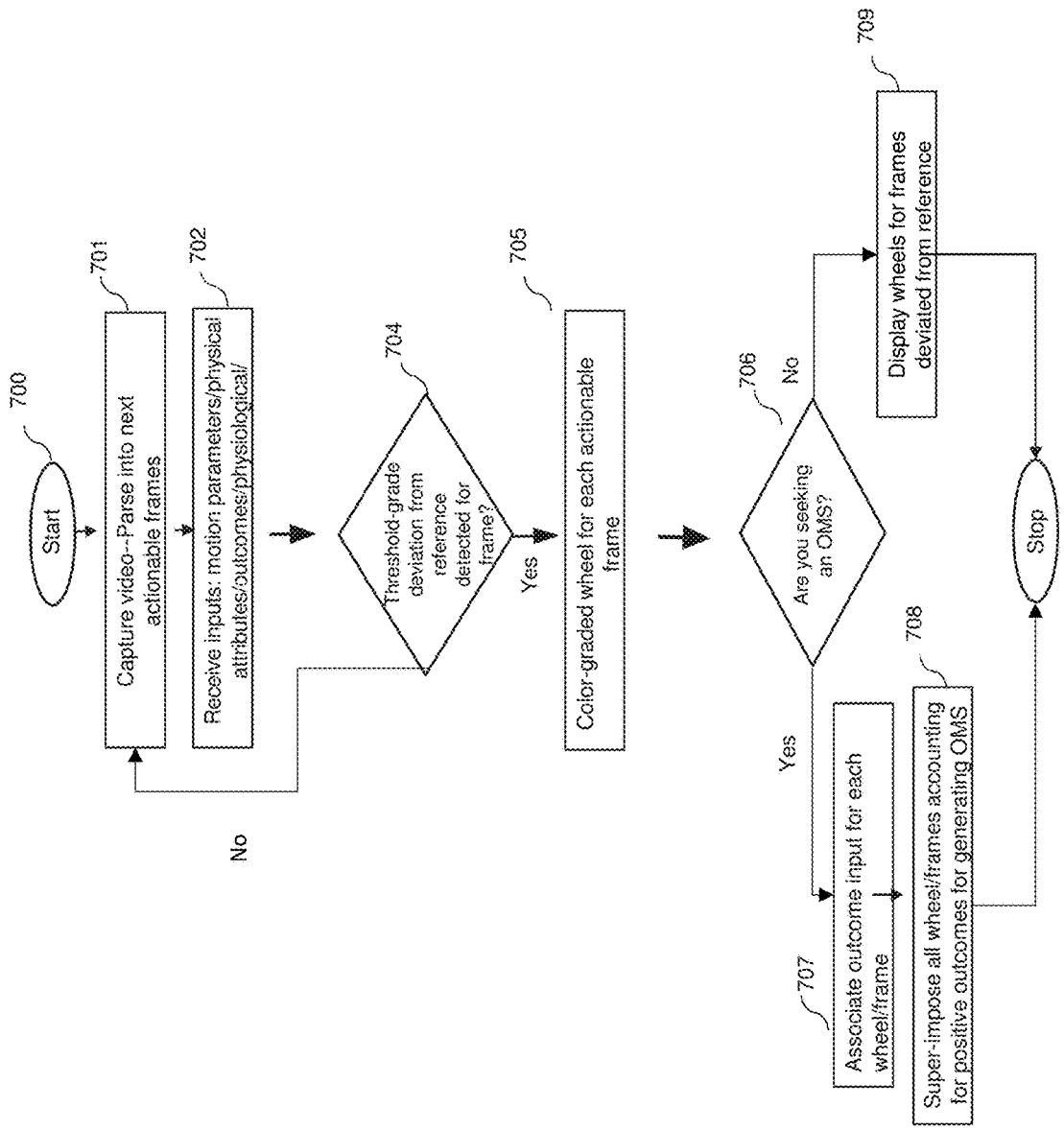

SKILLTECK FRAMEWORK/PLATFORM

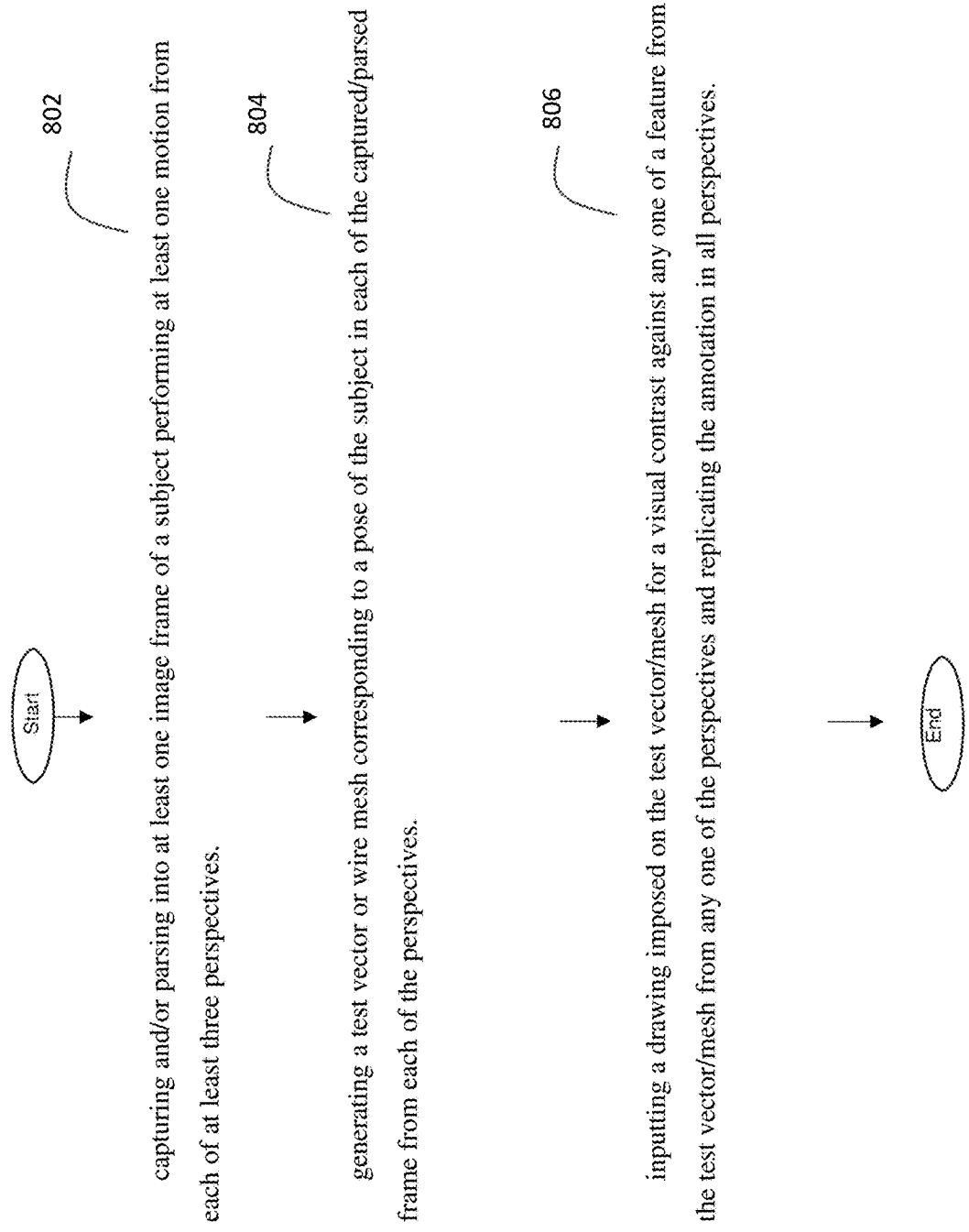

FIG. 17

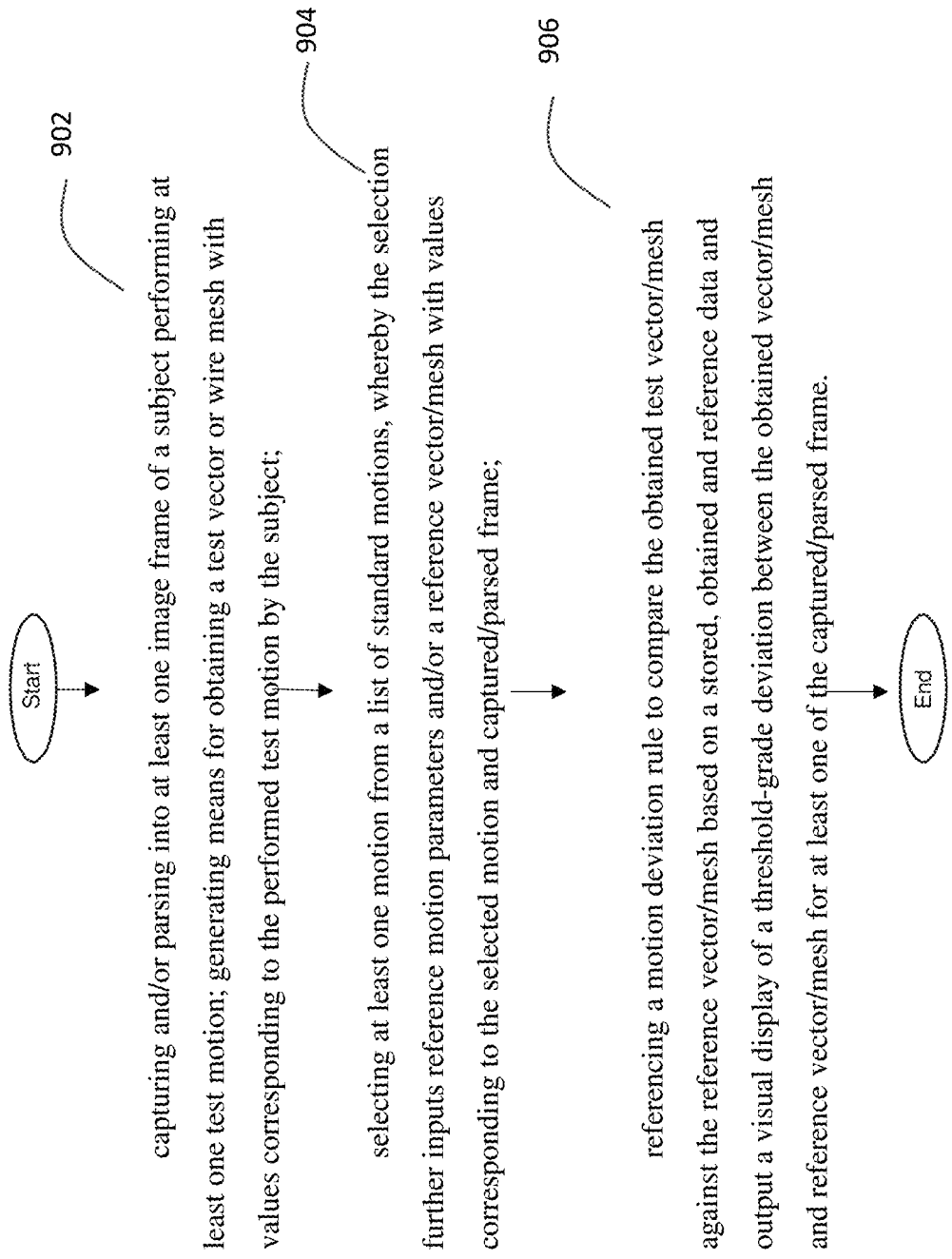

Start → capturing and/or parsing into at least one image frame of a subject performing at least one test motion; generating means for obtaining a test vector or wire mesh with values corresponding to the performed test motion by the subject; — 902

→ selecting at least one motion from a list of standard motions, whereby the selection further inputs reference motion parameters and/or a reference vector/mesh with values corresponding to the selected motion and captured/parsed frame; — 904

→ referencing a motion deviation rule to compare the obtained test vector/mesh against the reference vector/mesh based on a stored, obtained, obtained and reference data and output a visual display of a threshold-grade deviation between the obtained vector/mesh and reference vector/mesh for at least one of the captured/parsed frame. — 906

→ End

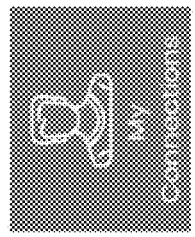
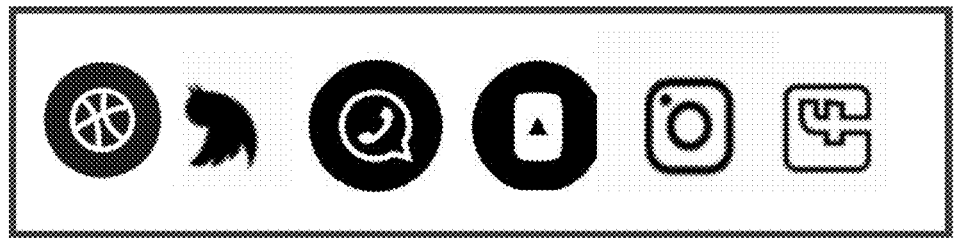
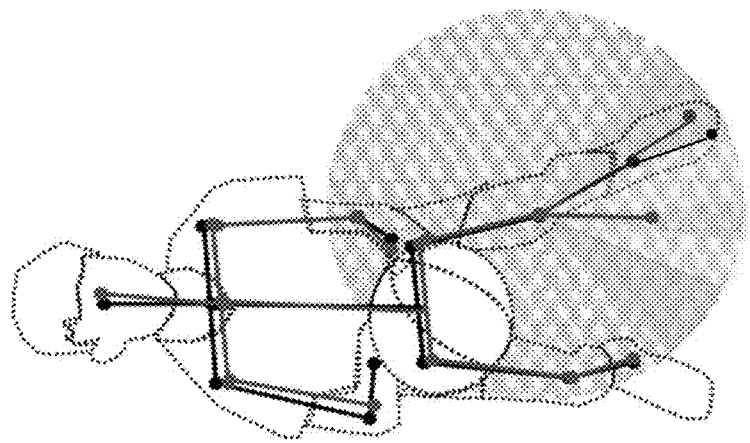
FIG. 20
Subject: Frazier, Clyde
Frame: fp-eg-2-lh-lt
Time: 022321/13:23
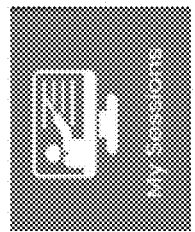
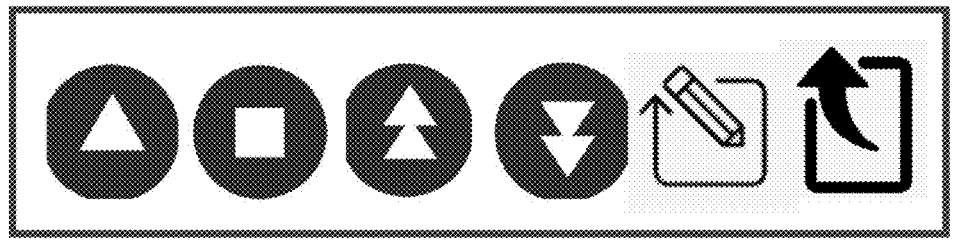

SYSTEM AND METHOD FOR A SPORTS-COACHING PLATFORM

BACKGROUND OF THE INVENTION

Field of the Invention

The present invention generally relates to a sports-coaching platform or tool-kit and more particularly, relates to a specific tool in the kit entailing a surround-annotation motion analysis (SAM) and the generation f a motion wheel for determining an optimal motion signature (OMS) for a specific coached-player. The invention discusses systems and methods to monitor coached players in game-action or drills to determine a SAM and/or OSM for a coached player—in real or deferred time—to yield the best outcomes for that particular coached player.

Description of Related Art

The advent and ubiquity of video/image-capturing mobile devices, in concert with the growing demand for real and deferred-time analytics, has led to an explosion of sports-coaching tools. These tools have not supplanted the need for the conventional "sleep-away camp" drill stations, but rather, added a "data-driven" layer for a more nuanced and personalized sports coaching session. Data-driven outcomes have been long exploited in the professional sports ranks, and now, due to the compute efficiencies of mobile devices and increased network bandwidth, data-driven outcomes even for youth sports are just a couple of swipes away.

According to a 2019 Global News Wire report, the youth sports app market was a $228 million market in 2018 and is expected to reach $3.4 billion by 2025. While scoring an athletic scholarship is a factor for the growing adoption of such apps, there is broad consensus that sports participation, team success, and personal skill progression dove-tail to build personal self-esteem and inter-personal skills that may prove useful "off-the-court." There are a number of commercially available applications for planning and analyzing training, managing data, and facilitating communication between coaches, managers, parents, and the coached players.

One such app is SportLyzer, which allows coaches, players, and parents alike, to event calendar with invitations, attendance track, log training, analyze performance tests, share training, comment on teammates or friends, track leaderboard position, embed website widgets, manage invoices, and import wearable data. However, this presumably all-in-one solution lacks the analytical nuances demanded for building an ideal motion profile or signature for a coached player. For instance, conventional wisdom is that there is a "textbook" form for each of the sequence of steps for an effective basketball jump-shot. This textbook sequence is an informal composite of generations of basketball players demonstrating a mastery of shooting—from Sam Jones to Ray Allen to Damian Lillard. However, even these masters of the long-ball, may deviate from "textbook" at any one or more steps in the total sequence. The complete sequence of steps—including for textbook, near-deviations, and drastic deviations along, the way from feet-set to ball-release—comprises a unique shot-signature, or more-broadly, a motion signature for the shooter. Much like a fingerprint, no two players have the same motion signature. Rather than just demanding that a player follows a textbook sequence, it becomes increasingly critical to determine what motion signature yields the most favorable outcomes and identify it as the optimal motion signature for replication by that particular player.

For instance, grip during the "gather" step affects feel, spin, connection, and control through your release. Textbook would dictate that placing your shooting hand behind the ball with the tip of your index finger on the middle of a seam of the ball guarantees proper finger alignment during the "release" step—ball release primarily from the index and middle finger, rather than the ring finger. However, certain historically great shooters, such as Steph Curry, who has a lower load and release point given that he is a quick-release, one-motion shooter, as opposed to a set-shot, two-motion shooter, better guarantees index and middle finger release with a wider gather stance and a wider grip then the textbook tight-pocketed, behind-the-ball grip. Conversely, a two-motion shooter, such as Michael Jordan or Kobe Bryant, who had higher gather, load, and release points, ensured index-finger release with the more textbook behind-the-ball grip, versus the wider grip. There are a myriad of variations when it comes to shot mechanics or signature, and it is safe to assume that no two players share signatures. While textbook may be a great starting point in developing a winning signature, it by no means is the be-all, end-all. Determining the unique signature for each player that yields the best outcomes is highly desirable. Leveraging existing video capture, object recognition, computer vision, augmented reality, sensor-gathered data, and analytic technology to push this unique signature via a platform is sorely needed.

Therefore, there is a need of a method and/or system for a sports-coaching platform that includes for determining a surround-annotation ration analysis, a visual display of form/motion deviation from a reference, and an optimal motion signature for a player based on a reference and player outcomes.

SUMMARY OF THE INVENTION

In an embodiment of the invention, a sports coaching platform is disclosed, enabling coaches, players, and parents to take advantage of video analytic tools for a data-driven approach to player development and team management. More specifically, the present invention relates to a system and method for enabling a surround-perspective annotation or surround-annotation motion analysis (SAM) for a deeper motion analysis, comprising an image/video input for capturing and/or parsing into at least one image; frame of a subject performing at least one motion from each of at least three perspectives; a vector generating module for generating a test vector or wire mesh corresponding to a pose of the subject in each of the captured/parsed frame from each of the perspectives; and an annotation module for inputting a drawing imposed on the test vector/mesh for a visual contrast against any one of a feature from the test vector/mesh from any one of the perspectives. Further, the annotation in any one pose/frame/perspective may then be automatically replicated to the same pose/frame onto any other perspective.

In another embodiment, a system and method is described for monitoring a player subject (coached player) motion to render a color-graded visual analysis of the motion (motion wheel). The system and method may further be configured to derive an optimal motion signature (OMS) for the player subject performing any one of an action based on the rendered color wheel and other inputs. In an embodiment of the present invention, the sports coaching platform includes inputting at least a first set of motion parameters from a reference point for any one of an action and based on captured image/video of the player subject performing the action and further based on sensed outcomes of the performed action, output a color-graded wheel with outcomes to deduce the OMS.

Further, user-input of player physical/body-type attributes may serve as an ancillary input for OMS determination. Additionally, basic or baseline motion characteristics of the player may be tracked for further ancillary input for OMS determination. Examples of baseline motion characteristics may include, but are not limited to, maximum value of acceleration, minimum value of acceleration, time of acceleration, duration of acceleration, frequency of acceleration, gap between two maximum/minimum values of acceleration, rotational velocity, direction of acceleration, orientation, a stride cycle, a left/right step, a stride length, a walking speed, a stride interval, a gait variability, a stride-to-stride interval and a variability of stride length over time. The baseline motion characteristics may be deduced from video analysis (object recognition, pixel analysis, computer vision, etc.) and/or motion sensor data (accelerometer, gyroscopic, magnetometer, etc.).

Going further, in one aspect, physiological characteristics may be tracked by any one of a wearable device for monitoring at least one of temperature, heart rate, blood pressure, or sweat during performance of the action as yet another ancillary input for OMS determination. Furthermore, depth information inputs from devices/technology such as LiDar/ToF may be used for informing output of at least one of the wire mesh (skeletal/fleshed) with perspective replication, a color wheel (with perspective replication), and/or an optimal motion signature (with perspective replication).

The system will typically employ one or more processors (e.g. compute processors such as microprocessors, and the like) and several types of algorithms to analyze the motion characteristics of any number of performed actions from any number of vantage points. The performed actions may include performing a jump-shot, pitching, serving, returning a service, forehand swing, backhand swing, bowling, passing a football, patient rehabilitation, etc. The system will enable engagement across sporting communities in new ways through mobile and social channels. Big data analytics, cloud computing, and connected technologies converge to help realize a novel framework for maximizing player potential. Coaches may use video as a white board and use Annotation and AI as visual aid to teach and improve players skills.

Deeper insights can be harnessed in innovative ways by this type of touch-point between actors and multi-factorial data, rather than just being data siloed/trapped in a single, isolated framework. Other aspects and advantages of the invention will be apparent from the following description and the appended claims.

BRIEF DESCRIPTION OF DRAWINGS

The drawings illustrate the design and utility of embodiments of the present invention, in which similar elements are referred to by common reference numerals. In order to better appreciate the advantages and objects of the embodiments of the present invention, reference should be made to the accompanying drawings that illustrate these embodiments. However, the drawings depict only some embodiments of the invention, and should not be taken as limiting its scope. With this caveat, embodiments of the invention will be described and explained with additional specificity and detail through the use of the accompanying drawings in which:

FIG. 7 illustrates an exemplary process flow according to an embodiment of the invention.

FIG. 16 depicts an exemplary method flow in accordance with an aspect of the invention.

FIG. 17 depicts an exemplary method flow in accordance with an aspect of the invention.

FIG. 20 depicts an exemplary screen-shot of the play and social functions tab overlaying an annotation, wheel, or OMS in accordance with an aspect of the invention.

DETAILED DESCRIPTION OF DRAWINGS

The present invention will now be described more fully with reference to the accompanying drawings, in which embodiments of the invention are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

In the following description, for purposes of explanation, numerous specific details are set forth in order to provide a thorough understanding of the invention. It will be apparent, however, to one skilled in the art that the invention can be practiced without these specific details.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but no other embodiments.

Overview

The primary purpose of the disclosure is to provide a sports-coaching/management platform/tool-kit comprising the following specific novel tools: a mesh with surround-annotation; provide a similar annotation-ready mesh against a color-graded motion deviation wheel for added visual support (color wheel); and optionally, derive an optimal motion signature (OMS) based on the generated wheel in real or deferred time. Further, additional (contextual) data inputs may be factored for a more representative mesh, wheel, and/or OMS, such as physiological inputs, user-inputs of body-type/injuries, etc. However, for a person skilled in the art, it is understood these examples are just for understanding purposes and the disclosure can be implemented for subjects other than aspiring athlete motion monitoring, such as, for example, patient rehabilitation. While player, player subject, subject, coached player, student, athlete, are the recurring terms used to refer to the monitored individual, they are all interchangeable, and are intended to additionally encompass any patient— within or outside of the rehabilitation context.

Exemplary Environment

Figure 1:
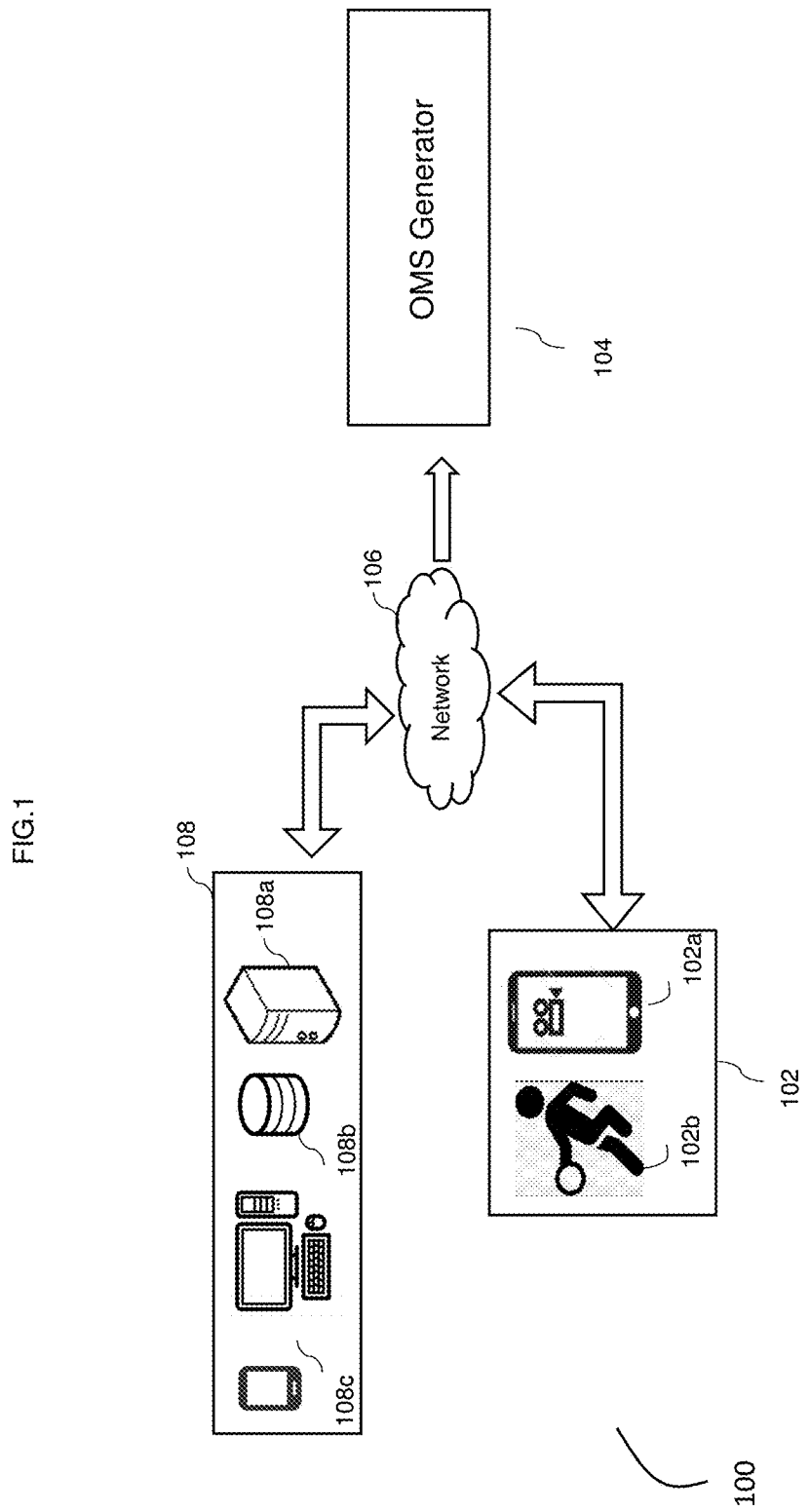
FIG. 1 describes an exemplary embodiment of the network.
Figure 2:
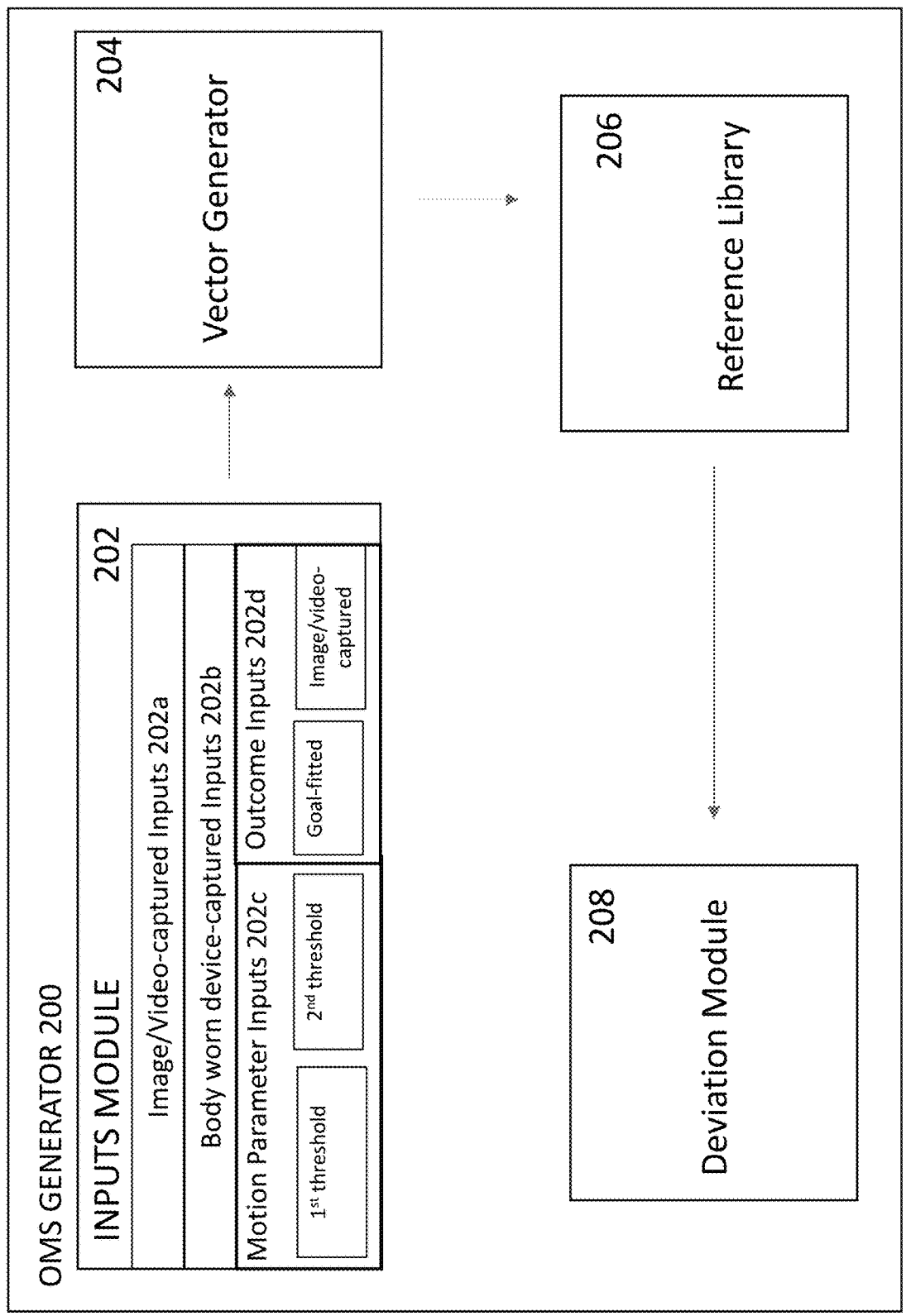
FIG. 2 illustrates an exemplary system in which various embodiments of the disclosure can be practiced.
Figure 3:
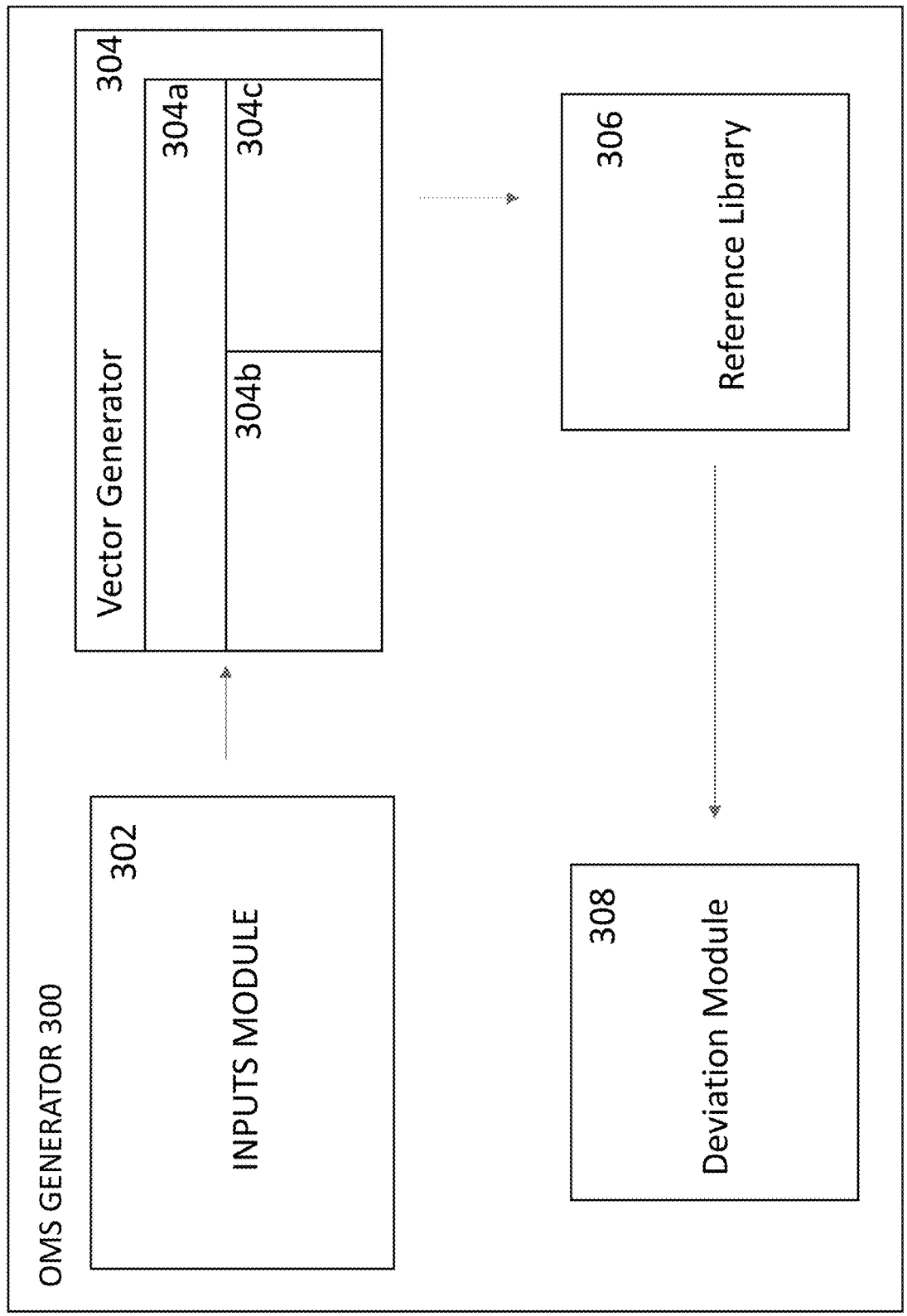
FIG. 3 illustrates an exemplary system in which various embodiments of the disclosure can be practiced.

FIG. 1 illustrates an exemplary environment 100 in which various embodiments of the present invention can be practiced. The environment 100 includes a player station 102, including for an image/video capture (mobile/tablet device) 102a and optionally, a data input means, such as a body-worn motion sensor 102b or basketball hoop-fitted sensor 102b for detecting made/missed shots, an Optimal Motion Signature (OMS) Generator 104 for generating any one of a surround-motion annotation, surround-motion annotation with analytics, surround-motion mesh with annotation/analytics, color-wheel/annotation/analytics, and/or an OMS/annotation/analytics. The player station 102 and OMS Generator 104 are communicatively coupled through a network 106 with server 108.

The mobile/tablet device 102a for image/video capture of the player is a portable device that has the capability of communicating over the network 106. Examples of the mobile communication device 102a include, but are not limited to, a smartphone, a tablet, a personal digital assistant (PDA), a mobile phone, a video camera, a still camera, etc.

In an embodiment of the present invention, the data captured by the one or more hoop-fitted or body-worn sensors 102b are first sent to the mobile device 102a, and thereby, sent to the processing unit (OMS Generator 104) over the network 106. The fitted or worn device 102b communicates with the mobile device 102a over a short range wireless communication medium. Examples of the short range wireless communication medium include Bluetooth, ZigBee, Infrared, Near Field Communication (NFC) and Radio-frequency identification (RFID).

Figure 22:
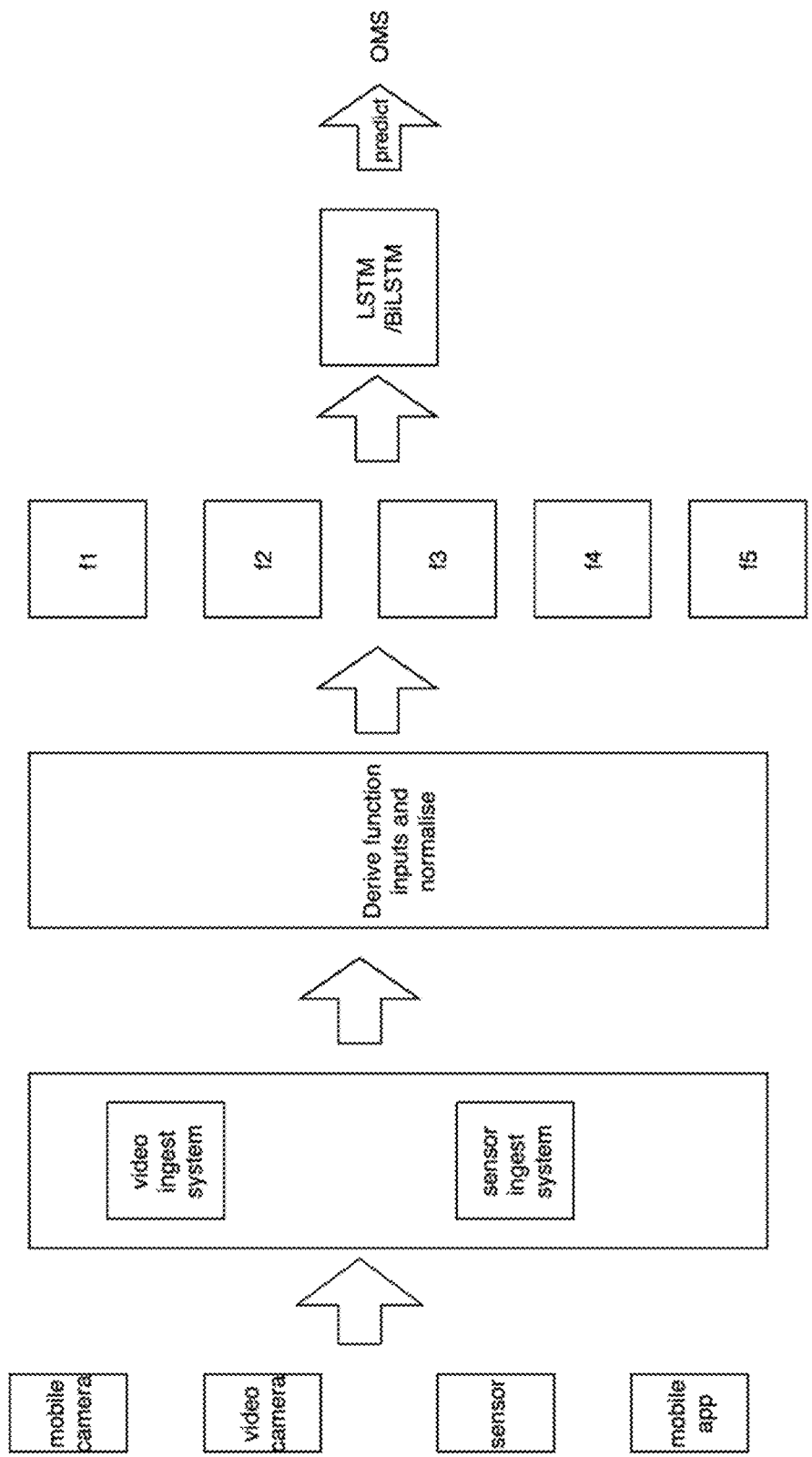
FIG. 22 depicts an exemplary schematic of the surround capture in accordance with an aspect of the invention.

As shown in FIG. 22, a schematic illustrating an exemplary architecture for surround image/video capture. In one embodiment, a mobile device from a spectator/coach can be the image/video capture of the subject. In a particular scenario, a single subject performing drills, or a plurality of subjects performing drills/game-play, the subject/s may be captured from a 360-degree vantage, each spectator/coach capturing a certain fraction (over-lapping/non-overlapping) of the 360-degree vantage—that may be curated, stacked, or stitched by a remote footage controller (input module of the OCM engine/pipeline).

Also shown in FIG. 22 is an array of drones configured for 360-degree image/video capture of the subject/s in drill or game-play. As with spectator/coach capture, each drone may be responsible for partial capture of 360-degree capture. Each drone may be in communication with each other, and further (optionally) commanded in a master-slave hierarchy. In other embodiments, the drones are controlled by the remote footage controller (input module) for drone operation and capture—not to mention curation, stacking, or stitching of each of the drone-captured/parsed frames. In some embodiments, the controller/module may aggregate the captured/parsed frames for a more robust frame set for increased resolution for surround-captured motion analysis (surround-annotation motion, color wheel, and/or optimal motion signature).

As shown in FIG. 22:

Spectators sit at various locations in the play area.

Log in to an app that shows the event going live.

They start recording on the mobile camera.

If there is enough space to move around, one may move around and record.

The app then streams the feed live into the control center (controller/input module).

At the end of the event, they stop recording.

Drones may optionally be commanded by the control center.

They have geo-spatial mapping of the play arena.

Control center activates the drones and controls the movement of them around the play area.

Drones are activated to start recording of the event.

The recording is streamed live to the control center.

At the end of the event, the drones are instructed to stop recording.

The live stream is processed at the control center.
Audio and visuals are both processed that determine the similarity of the time and frame.
The images are analyzed for position and alignment of the inputs so that duplicate inputs can be removed.
The engine processes every input frame by frame and removes duplicated frames.
The frames are then combined and processed to get a 360 degree view of the entire event.
Optionally, using face recognition and pattern recognition, video can be split to cover only one particular individual or a set of individuals who were in the event.
These frames are then used to get the perfect frames for each and every individual from every angle.
The files become an input to the players SAM, color wheel, and/or OMS, processing inputs from various angles to derive player body postures, movement and agility. There can be other applications such as:

deriving the individual and event statistics more accurately.

personalizing highlights of each event.

In continuing reference to FIG. 1, the network 106 may be any suitable wired network, wireless network, a combination of these or any other conventional network, without limiting the scope of the present invention. Few examples may include a LAN or wireless LAN connection, an Internet connection, a point-to-point connection, or other network connection and combinations thereof. The network 106 may be any other type of network that is capable of transmitting or receiving data to/from host computers, personal devices, telephones, video/image capturing devices, video/image servers, or any other electronic devices. Further, the network 106 is capable of transmitting/sending data between the mentioned devices. Additionally, the network 106 may be a local, regional, or global communication network, for example, an enterprise telecommunication network, the Internet, a global mobile communication network, or any combination of similar networks. The network 106 may be a combination of an enterprise network (or the Internet) and a cellular network, in which case, suitable systems and methods are employed to seamlessly communicate between the two networks. In such cases, a mobile switching gateway may be utilized to communicate with a computer network gateway to pass data between the two networks. The network 106 may include any software, hardware, or computer applications that can provide a medium to exchange signals or data in any of the formats known in the art, related art, or developed later.

Figure 15:
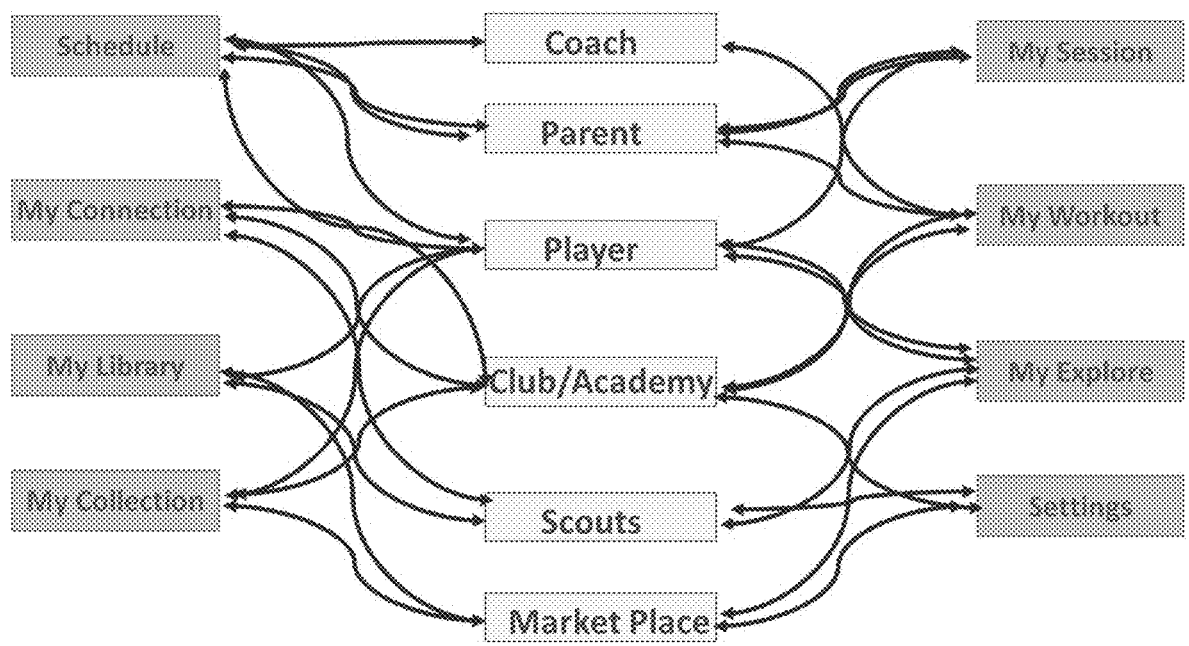
FIG. 15 depicts an exemplary interaction scheme of the OMS in accordance with an aspect of the invention.

In an embodiment of the present invention, a concerned party (coach, teammate, parent, etc.) is able to view/access—by invitation or otherwise— the reports (analytics, surround-annotated mesh, color wheel, or OMS), as generated by the OMS Generator 104 using one or more client devices 108c selected from the group comprising a smartphone, a computer, a laptop, a tablet, a personal digital assistant (PDA) and a mobile phone. Additionally, a concerned party may longitudinally track progress/development of any one particular player; schedule work-outs; annotate; comment; and share across social platforms via a device user-interface (reference FIG. 15—a representative screen shot of the user interface, and FIG. 16—an exemplary interaction scheme or menu of functional features of the platform).

In a continuing reference to FIG. 1, the network-coupled server/cloud-based server 108 may be a device capable of processing information received from at least one of the image/video capture 102a and/or user input/sensor input 102b. Other functionalities of the server 108 may include providing a data storage, computing, communicating and searching. Further yet, in an embodiment of the present invention, the data input is from at least one of a device that outputs an audio and, or video signal during operation. The audio, video outputs may be from any one of a Closed-Circuit Television (CCTVs) cameras, High Definition (HD) cameras, non-HD cameras, handheld cameras, or any other video/image receiving units as well as the users' surrounding environments. The OMS Generator 104 may be configured to receive a dynamic imagery, audio or video footage from the audio/video receiving devices, and transmit the associated data to downstream modules within the OMS Generator 104 for further dynamic provisioning (SAM, color-wheel, and/or OMS). In an embodiment, the memory element coupled to the processor may maintain the dynamic audio/video footage as received from the video/image receiving devices. Alternatively, the native or processed audio/video inputs may be archived and stored in a data storage element coupled to a processor that is configured to store pre-recorded or archived audios/videos. The audio/video inputs may be stored in any suitable formats as known in the art or developed later. The audio/video input archive may include a plurality of local databases 108a or remote databases 108b. The databases 108a, 108b may be centralized and/or distributed. In an alternate scenario, the audio/video input archives may store data using a cloud based scheme.

FIG. 2-FIG. 5 illustrate exemplary system diagrams in accordance with an aspect of the invention. Each subsequent figure from FIGS. 2-5 highlights a distinct and downstream module within the OMS Generator. In a preferred embodiment of the invention, the OMS Generator 200, 300, 400, 500 comprises capturing at least one of an image/video 202a and optionally, body-worn motion sensed data 202b, user-inputted motion parameters 202c, outcome data (CV/object detected) 202d, a network interface, a processor, a non-transitory storage element coupled to the processor with encoded instructions stored in the non-transitory storage element, wherein the encoded instructions when implemented by the processor configure the OCM generator 200, 300, 400, 500 to capture the inputs from the inputs module 202, 302, 402, 502, transmitting at least one of the image/video data input 202a, body-worn data input 202b, user-inputted motion parameter/s 202c, or outcome inputs (CV-object detected/goal-sensor-fitted) 202d to the vector generator 204, 304, 404, 504.

Figure 8C:
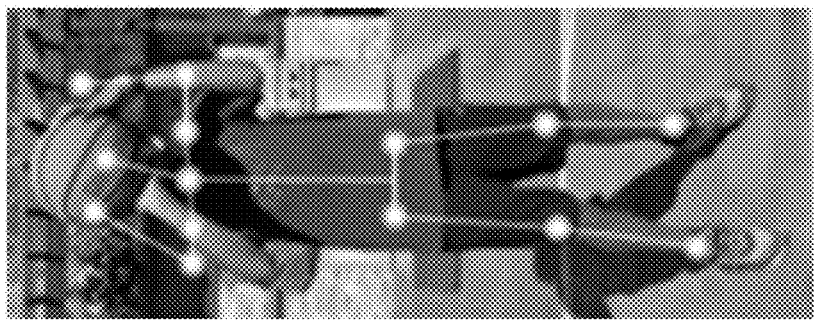
FIG. 8c depicts an exemplary mesh in accordance with an aspect of the invention.
Figure 8B:
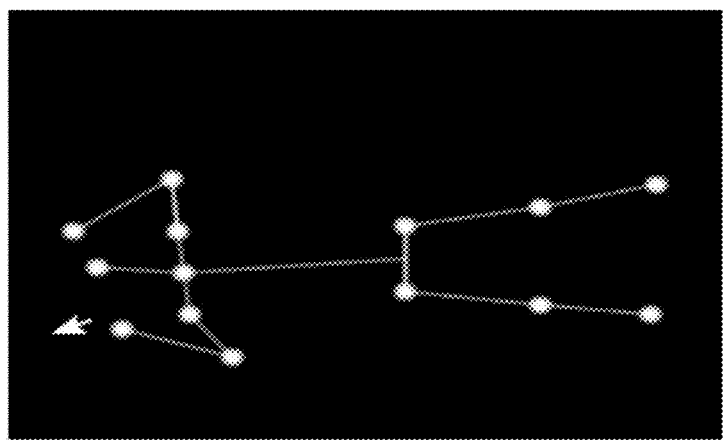
FIG. 8b depicts an exemplary mesh in accordance with an aspect of the invention.
Figure 8A:
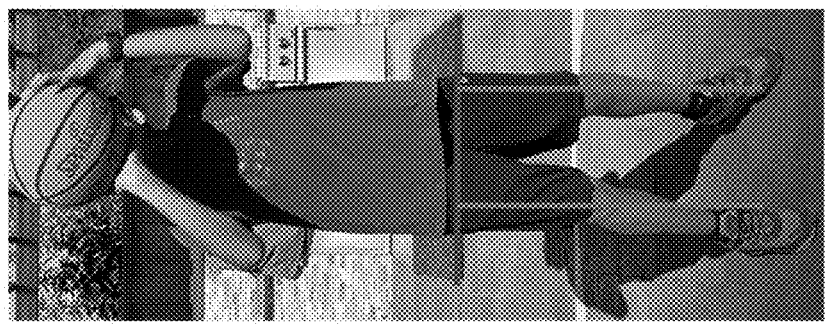
FIG. 8a depicts an exemplary straight-line annotation in accordance with an aspect of the invention.
Figure 11C:
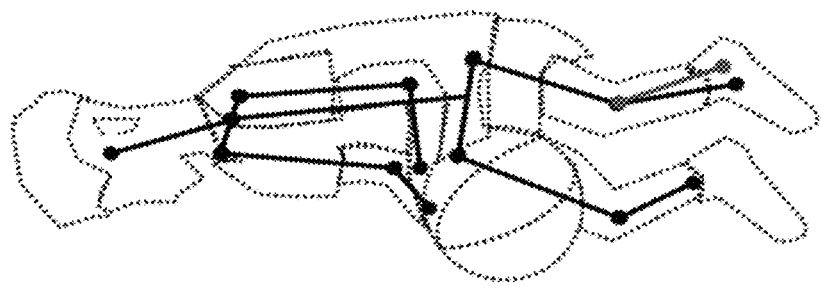
FIG. 11c depicts an exemplary SAM from a third perspective and first motion wheel in accordance with an aspect of the invention.
Figure 11B:
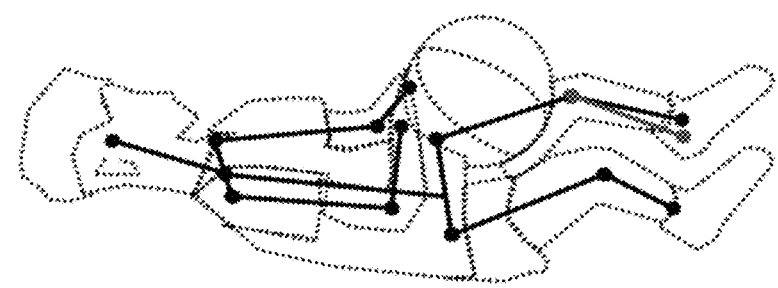
FIG. 11b depicts an exemplary SAM from a second perspective and first motion frame in accordance with an aspect of the invention.
Figure 11A:
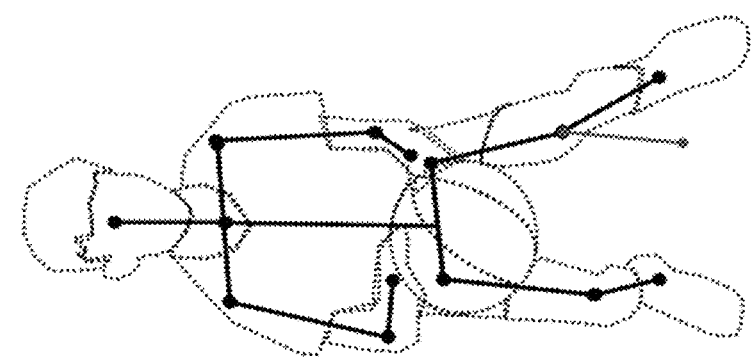
FIG. 11a depicts an exemplary surround-annotation motion (SAM) from a first perspective and first motion frame in accordance with an aspect of the invention.

In an embodiment, the vector generator 204, 304, 404, 504 may capture at least one of the inputs from each of a plurality of perspectives to minimally generate a surround-annotation for motion analysis by a surround-annotation module 304a within the vector generator 204, 304, 404, 504. In other words, an annotation in one frame will mirror the annotation from corresponding frames from the other perspectives. For instance, an annotation featuring a straight-line drawing between the hip-knee vertex and knee-ankle vertex for Clyde in the front perspective-load-pose/frame no. 3 (f-lp-3), to illustrate the virtue of keeping feet shoulder-width apart and aligned during the load pose, may be automatically replicated to similar poses/frames across different perspectives (side-load-frame 3, rear-load-frame 3, etc) to insta-illustrate the same lesson across perspectives and insta-track for consistency across the entire sweep of the motion. FIG. 8a is a front perspective illustration of Clyde, in presumably the load pose/frame (f-lp-3). Notice Clyde's left foot is slightly in front of his right foot. While the feet misalignment is not immediately discernable from the front perspective view, it may be far more discernable from the corresponding frame from the right side perspective (rsp-lp-3), in which case the previous annotations may be replicated to further emphasize the feet misalignment. FIGS. 11a-11c represent exemplary surround-annotation motion. All three figures represent different perspectives of the same subject in the same frame/pose—with the initial annotation mirrored/replicated in all perspectives (perspective replication).

Figure 9:
FIG. 9 depicts an exemplary mesh with analytics in accordance with an aspect of the invention.
Figure 10:
FIG. 10 depicts an exemplary mesh with annotation and analytics in accordance with an aspect of the invention.

Further yet, in a preferred embodiment of the invention, the inputs module 202, 302, 402, 502 transmits at least one of the image/video data input 202a, body-worn data input 202b, user-inputted motion parameter/s 202c, or outcome inputs (CV-object detected/goal-sensor-fitted) 202d to the vector generator 204, 304, 404, 504. The vector generator 204, 304, 404, 504, and more specifically, the wire mesh module 304b, may generate a wire mesh (skeletal mesh or super-imposed mesh) comprising of vertices that correspond to the player, that is likewise, configured for surround-annotation (FIG. 8b illustrates a skeletal mesh of Clyde in the same frame/pose/perspective in accordance with an aspect of the invention, while FIG. 8c illustrates a wire-mesh frame of Clyde from FIG. 8b super-imposed on a still-image of Clyde in the same frame/pose/perspective). Further, optionally, the wire mesh may further be layered with basic to advanced analytics by the analytical module (304c) for quantitative assessment of vertex angles, distance, straight line angles to vertex/vertices, etc. FIG. 9 illustrates a fleshed mesh with a layer of analytics, while FIG. 10 illustrates a fleshed mesh annotated imposed with an analytical layer.

Figure 4:
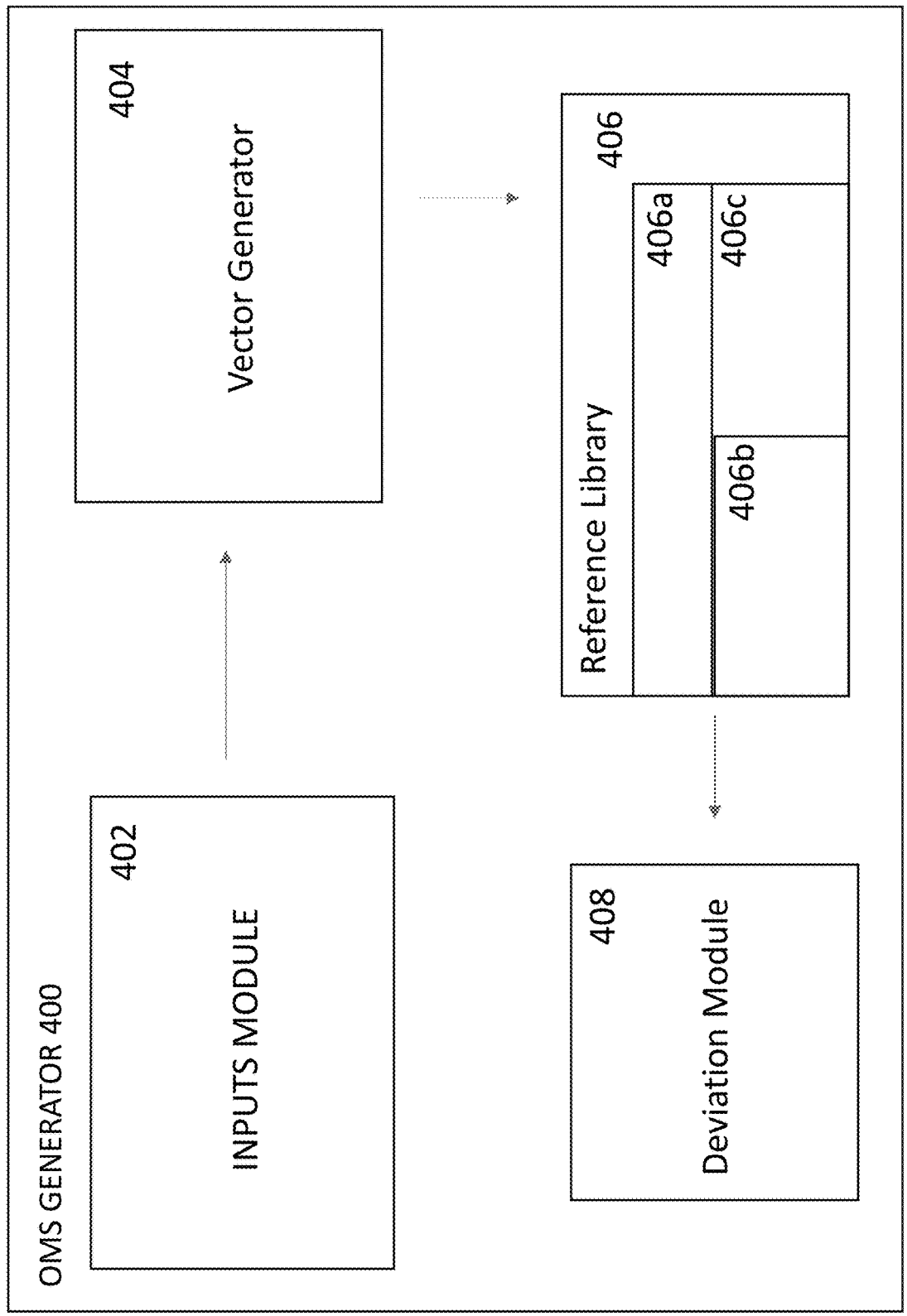
FIG. 4 illustrates an exemplary system in which various embodiments of the disclosure can be practiced.
Figure 6:
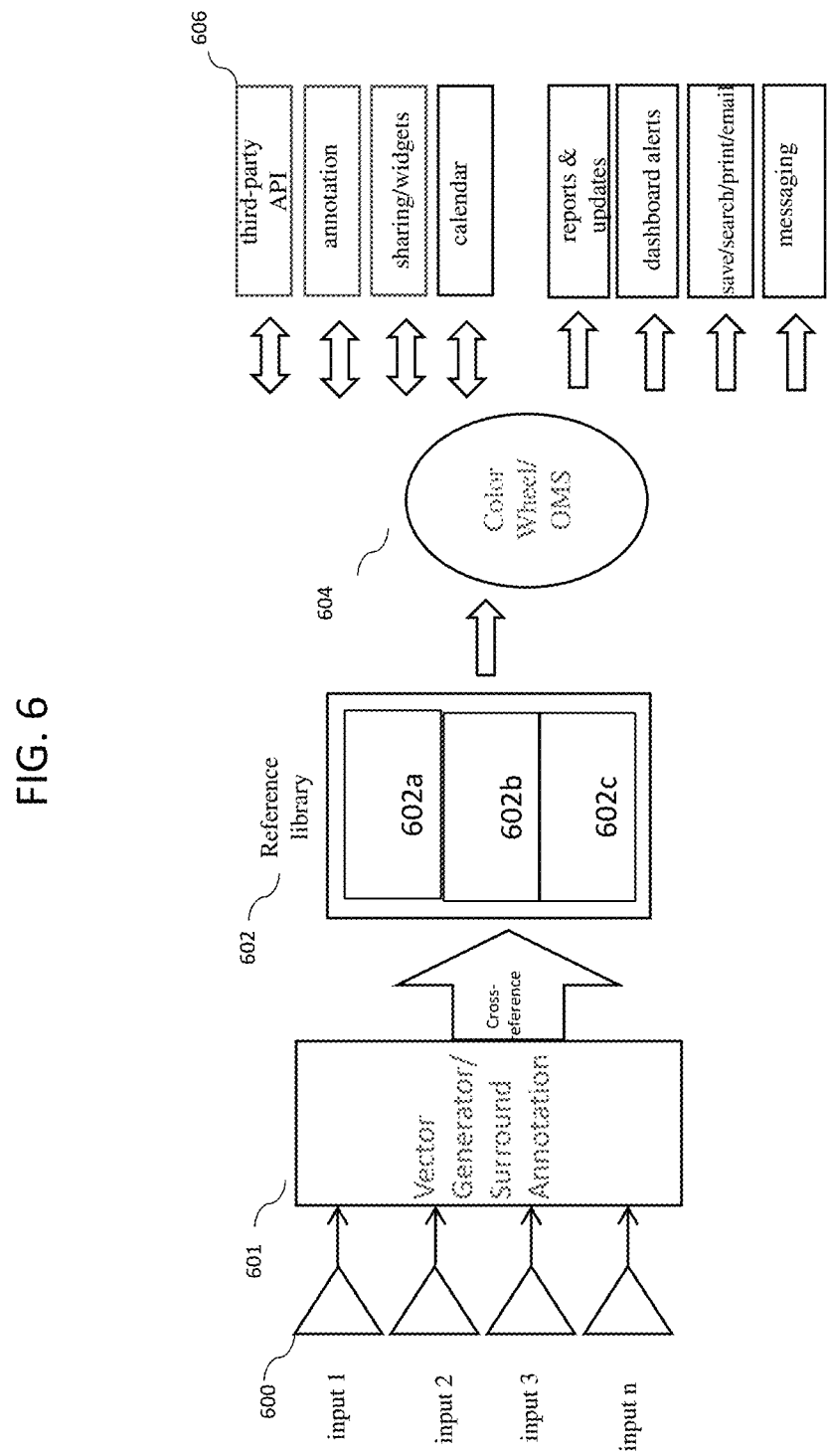
FIG. 6 illustrates an exemplary interaction flow in which various embodiments of the disclosure can be practiced.

Furthermore, in an embodiment, the wire mesh (skeletal/fleshed) is generated by the vector generating modules 204, 304, 404, 504 using the following methods:

One or more (surround-stationed/capturing) devices can be used to capture images/video of the player from different angles/perspectives and those videos can be analyzed separately together to extract meaningful information at every point of time (frame/pose). The following computer vision and other ML (Machine Learning) techniques to do analysis of the videos may be performed by the vector generator 204, 304, 404, 504:
YOLO for faster object detection;
OpenPose/AplhaPose/PoseNet CNN(Convolutional neural network) model so do pose estimation of the players and estimate body posture coordinates (angles between vertex, for instance);
Derive the speed of body movements using RNN (Recurrent neural network) models and other computer vision techniques;

Further yet, in another embodiment, once frame/pose is estimated with angle/distance data by the vector generator 204, 304, 404, 504, the data is referenced against a library 206, 306, 406, 506 of angle/distance data of a reference player in the corresponding frame/pose and body-style to infer a deviation. As shown in FIG. 4 (406a-c) and FIG. 6 (exemplary interaction flow—602a, 602b, and 602c), the reference library is a catalogue of reference data (motion values, motion parameters 602a, reference vertex angle ranges 602b, angle deviation parameters 602c, etc.) and based on the motion/angle parameters established by the player/coach/parent (any interested stake holder) and the inputted data/vector 402/404/600/601, the severity or grade of deviation is visually outputted in a color wheel 604 (illustrated in greater detail in FIGS. 12a-c). As shown in FIG. 6, several plug-in/widgets/extensions are possible, such as API-mediated 3rd party database integration (Electronic Medical Records, Elias Sports Bureau, etc.), remote server and, or a cloud-based server for other downstream analytics and provisioning 606—namely, dashboard alerting/notifications, calendaring, goal tracking, report building/archiving/retrieving, motion signature referencing and other deeper analytic and annotation tools Additionally, the completed automated responses may be saved onto a remote cloud based server for easy access for data acquisition and archival analytics for future updating (also reference FIG. 15—menu of interactive options).

Figure 5:
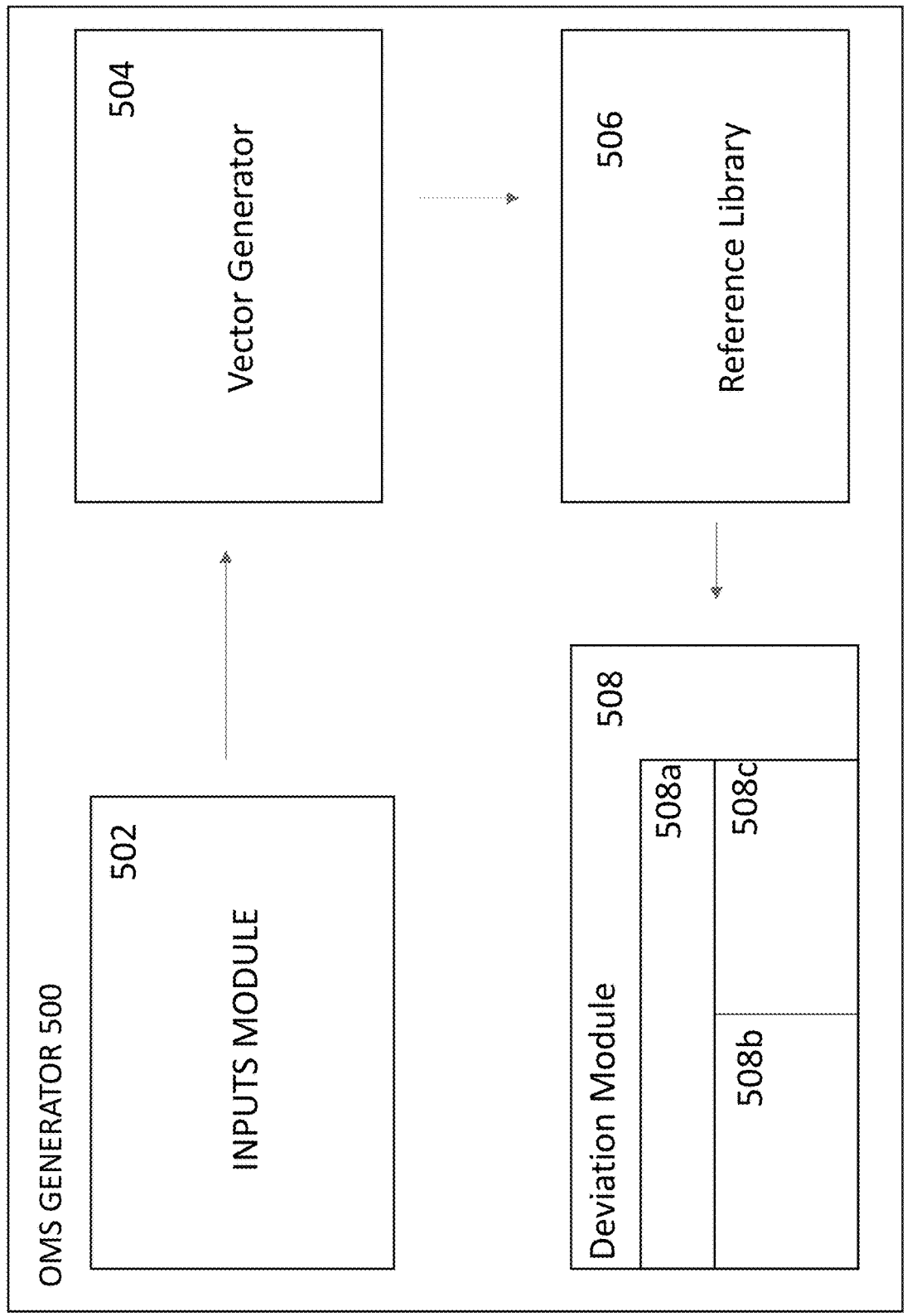
FIG. 5 illustrates an exemplary system in which various embodiments of the disclosure can be practiced.

FIG. 5 illustrates an OMS system or engine 200, 300, 400, 500, emphasizing the deviation module 208, 308, 408, 508, and more particularly, a color-wheel 508a, dashboard provisioning 508b, 606, and Optimal Motion Signature (OMS) 508c. The OMS 508c is derived from an overlay of all frames/poses in sequence from a single perspective that are associated with a motion that yielded a positive outcome. The sequentially overlaid positive frames reconstitute a single motion/action performed by the player subject. This reconstituted motion may in any of the frames/poses/perspectives deviate grossly from the reference and still be considered optimal for the player subject due to the bias for frames with positive outcomes.

Figure 12C:
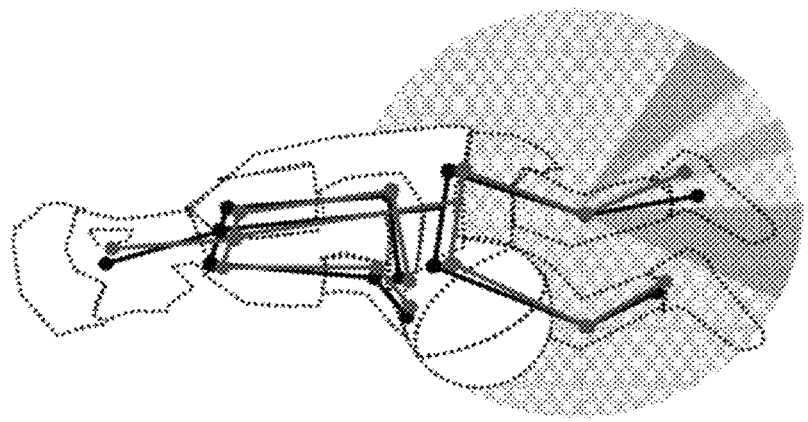
FIG. 12c depicts an exemplary color-wheel from a third perspective and first motion wheel in accordance with an aspect of the invention.
Figure 12B:
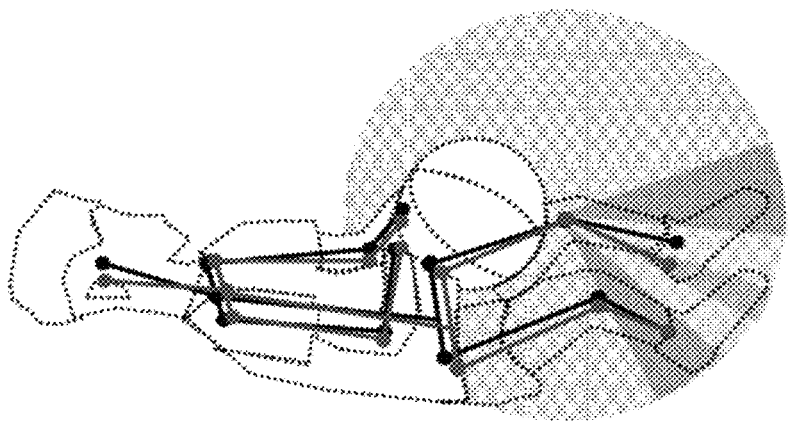
FIG. 12b depicts an exemplary color-wheel from a second perspective and first motion frame in accordance with an aspect of the invention.
Figure 12A:
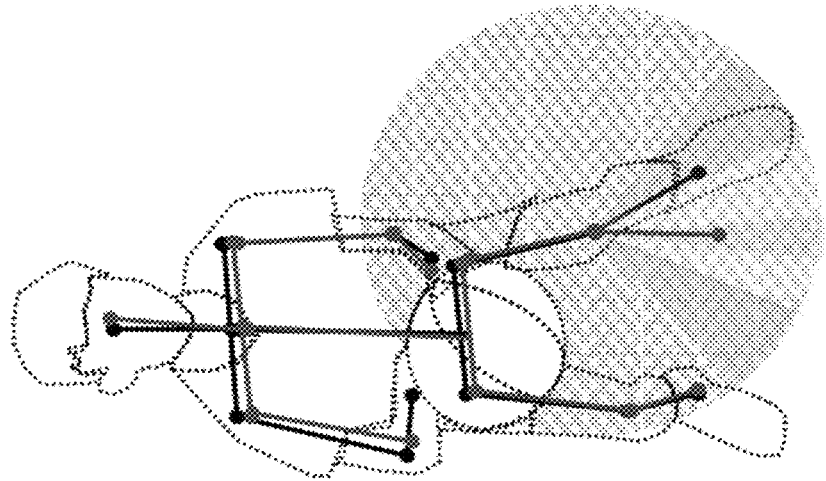
FIG. 12a depicts an exemplary color-wheel from a first perspective and first motion frame in accordance with an aspect of the invention.

For instance, as illustrated in FIG. 7 (an exemplary process flow 700) and described through the perspective of the earlier mentioned Clyde, once his video is captured and parsed into distinct actionable frames/poses for each or the perspectives or at least a single perspective 701; a threshold-grade deviation 704 is established for any vertex for any frame for any perspective of Clyde mapped against corresponding vertex/frame/perspective based on any number of earlier described inputs 702. Based on the vertex being focused on, for any one of Clyde's poses in any one frame and perspective, any one of Clyde's anatomical features (limbs, digits, shoulders, head, etc.) or associated objects (ball, sneakers, etc.) may fall in any one of three color-coded zones of the color wheel 705, depending on the initially established parameters and severity of the deviation. FIGS. 12a-12c illustrates exemplary color-wheels generated from three different perspectives of the same frame/pose. Again, since Clyde's left foot is in front of his right foot and not set and shoulder-width apart, the left hip-left knee and left knee-left foot vertices fall in the red zone based on parameters/thresholds or a series of parameters/thresholds from the established reference. Further, in some embodiments, the color wheel may further be annotated with perspective replication, as would the reference (focused) vertex.

Figure 13C:
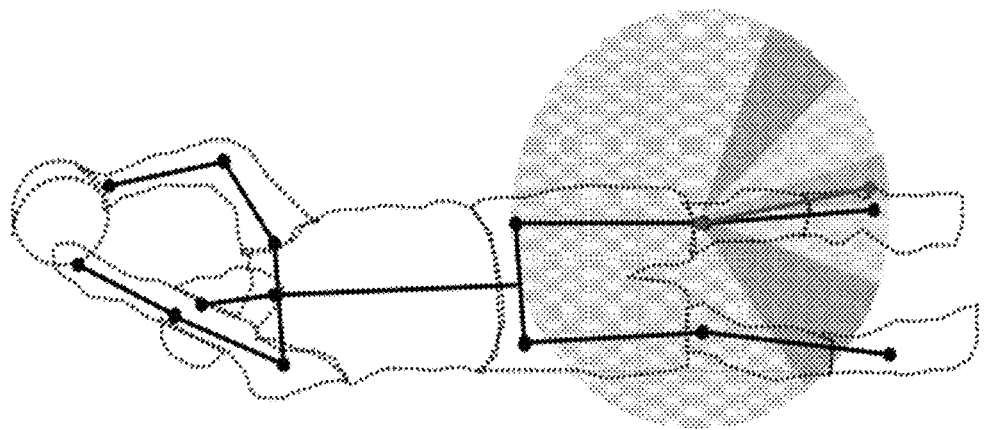
FIG. 13c depicts an exemplary OMS from a third perspective and second motion frame in accordance with an aspect of the invention.
Figure 13B:
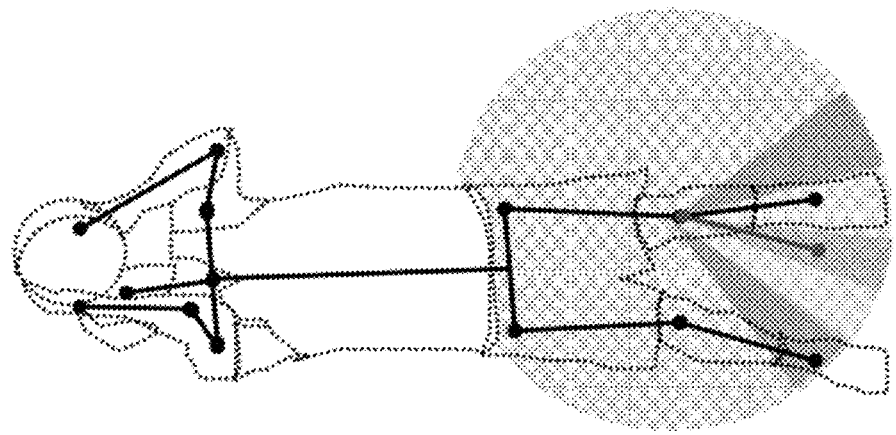
FIG. 13b depicts an exemplary OMS from a second perspective and second motion frame in accordance with an aspect of the invention.
Figure 13A:
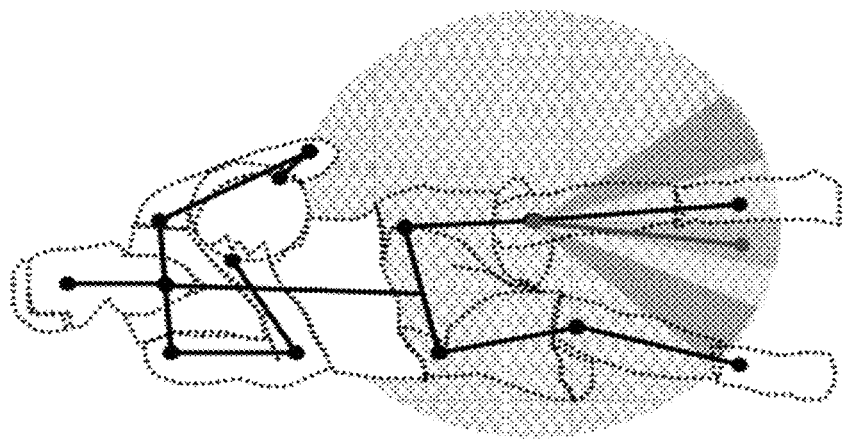
FIG. 13a depicts an exemplary optimal motion signature (OMS) from a first perspective and second motion frame in accordance with an aspect of the invention.
Figure 14:
FIG. 14 depicts an exemplary screen-shot of the user interface in accordance with an aspect of the invention.

In continuing reference to FIG. 7, if Clyde's coach, Coach Holtzman, decides to want to generate an optimal motion signature for Clyde 706, he can choose to do so. If coach Holtzman desires to simply show frames with a visual display of deviation of Clyde's left foot 707, he can simply share the color-wheels of any frame/pose/perspective with Clyde 709, whereby the deviation of the left foot placement is most discernable (FIG. 12a illustrates an exemplary color wheel in a front perspective showing a red-grade deviation of the left knee-foot vertex of Clyde in an early gather pose/frame: fp-eg-2-lk-lf/early gather-front perspective-frame no. 2-left knee-left foot vertex). Given that the left foot misplacement is not easily discernable from the front perspective, Coach Holtzman chooses (optionally, from a library/menu of stored poses/frames/perspectives) a pose/frame/perspective corresponding to the early gather pose from a right-side perspective (FIG. 12b illustrates an exemplary color wheel in a side perspective showing the same red-grade deviation of the left knee-foot vertex: rsp-eg-2-lk-lf/early gather-right-side perspective-no. 2-left knee-left foot vertex). To further reinforce the point, Coach Holtzman decides to share the left perspective wheel with Clyde as well (FIG. 12c illustrates an exemplary color wheel in a left side perspective showing the same red-grade deviation of the left knee-foot vertex: lsp-eg-2-lk-lf/early gather-left side perspective-no. 2-left knee-left foot vertex). After viewing this particular wheel himself, Clyde suspects that his left foot seems pointed ever-so-slightly right—in addition to being placed in front of his right foot—and decides to query the same frames/pose, but references back to the front perspective and focused on the left heel-toe vertex this time to gauge directionality of his left foot (fp-eg-2-lh-lt/early gather-front perspective-no. 2-left heel-to-left toe vertex). After confirming his suspicion, he annotates and shares back to Coach Holtzman of the directionality issue. Upon receiving, Coach Holtzman queries outcomes (field goal percentage) focused on the left-heel/left-toe vertex and recognizes below average outcomes. In one embodiment, Coach Holtzman may manually elect to exclude all frames with left heel-toe vertex above threshold for the OMS generator to frame-stack into an optimal motion signature (OMS). In other embodiments, the OMS generator will automatically exclude frames with poor outcomes (including Clyde's left foot misdirection) to generate the OMS for Clyde. FIGS. 13a-13c depict an exemplary OMS from a front perspective, illustrating the gather pose (FIG. 13a), load pose (FIG. 13b), and release pose (FIG. 13c). The OMS may be a stack of all positive frames from any perspective—in sequence—further configured for additional annotation as needed with perspective replication. Coach Holtzman decides to share Clyde's OMS with his teammates, each OMS tailor annotated for the specific teammate. For instance, Coach Holtzman's remarks on Clyde's OMS references Clyde's back-posture on the gather pose in his share with Pearl. Coach Holtzman has long decried a need for Pearl to keep an up-right posture during shot set-up (gathering). Further, Clyde so may choose to embed the frame/series of frames (OMS) into his social media pages (FIG. 20 illustrates an exemplary screen-shot of the color wheel with play and social function tabs). Deeper insights can be harnessed in innovative ways by this type of touch-point between actors and multi-factorial data, rather than just being data siloed/trapped in a single, isolated framework.

Back in reference to FIG. 7 (process flow chart), if Coach Holtzman decides that he would like to create an optimal motion signature for Clyde, he can elect to generate an OMS. Coach Holtzman may feel that rather than developing Clyde's jump-shot based on a best practice approach (mapped against a reference), there may be a slightly unorthodox form that could be embraced and yield better outcomes. A plethora of shots could be taken by Clyde—captured/parsed/mapped in multiple perspectives—while tracking made shots with particular pose/frame/perspectives 707. Once those pose/frame/perspectives are filtered out, they may be super-imposed on one another in sequential fashion to generate an optimal motion signature (OMS) 708.

One challenge to overcome is mapping the subject frame to reference frame in order to achieve ideal mapping of frames for more accurate cross-perspective annotation (surround-annotation motion), color-wheel, and OMS. An exemplary approach for frame mapping is: First, shoot a video of a single subject performing a shooting drill (optionally, from multiple perspectives). Secondly, we need to parse and identify actionable frames (frame-by-frame). Not every frame may have actionable value. Actionable frames (for basketball) may be at least one of a gather, load, and release pose. Thirdly, once the actionable frames are selected, perform pose estimation (opencv python-caffe DNN model) and object (ball) detection (using YOLO) for each of the selected frames. Fourthly, build a logic to identify the shooting frame based on coordinates of the body part joints and position of the ball. Fifthly, once we identify the shooting frame and know the coordinates of the body joints, we can find the angles (wrist angle, elbow angle, knee angle ... etc.). We can use this angle to match with rules (informed by inputted parameters) to determine how deviated the subject is from a reference. The rule may be informed by detection of objects, rather than body part angle/coordinates. For example, one rule may say—eyes shouldn't block the ball or should be below the ball and between your hands when you release the ball for shooting.

As discussed earlier, we are trying to automate the coaching annotation/feedback on a shooting video. We are trying to see if we can automate two simple checks—while a player releases the ball (called release point in coaching terminology), we need to check:

1. Whether the ball is blocking the players eye?
2. Are the legs straight with no bent on the knee and are parallel?

The belief is that if we can successfully solve these two simple checks, and slowly and incrementally, we can eventually solve more complex checks as well. Our approach is to use the coordinates of ball and body joints to build a logic for this. For example, to check if the ball is blocking the eyes, we can probably build a logic like this:

1. Detect the ball on every frame and find the coordinates of lowest position/bottom of the ball.
2. Do posture analysis to get the coordinates of body joints.
3. Is the ball above the hands=use the coordinates of ball and hand wrists to check this.
4. Distance from ball to wrists=use the coordinates of ball and hand wrists to derive the distance.
5. Is the ball above the shoulders=use the coordinates of ball and shoulders to check this.
6. Are the coordinates of eyes within ball=use the coordinates of ball and eyes to check this.
7. Is the ball blocking eyes=(is ball above the hands & distance from ball to wrists<[small value] && is ball above shoulders && is coordinates of eyes within ball).

Object/feature detection within selected frames may be alternatively achieved by matching any one of the selected frame/objects/features with training images (OCM Generator/Reference Library) by a detection or recognition or matching module within the OCM-G/Deviation Module comparing feature descriptors of corresponding frames from each of the selected frame and training image.

In yet another alternative approach for object/feature detection, a neural network may be used that is trained for body joint estimation for desirable frames. In one embodiment, the removal of the "undesired" frames may be based on a user's unactionable pose or limited visibility detected. A deep neural network may be trained to extract dense pixel correspondences across consecutive frames. Optionally, one may use separate extractors for different parts of the body (e.g. one model for head and another model for body). One may then leverage a frame-to-parametric model to filter the frame-to-frame correspondences based on the distance between them on the parametric model surface.

Further yet, a pixel velocity score, pixel color score, or other computer vision tactics may be used for object/feature detection across frames/pose/perspective. For instance, a pixel velocity score may be calculated by capturing a series of frames, and calculate the delta in any one of a brightness, saturation, luminance, or hue, and derive the pixel velocity score of the object/feature across frames/perspectives. Further, a pixel color score may be calculated using any color-centric pixel data in a screen buffer.

Figure 21:
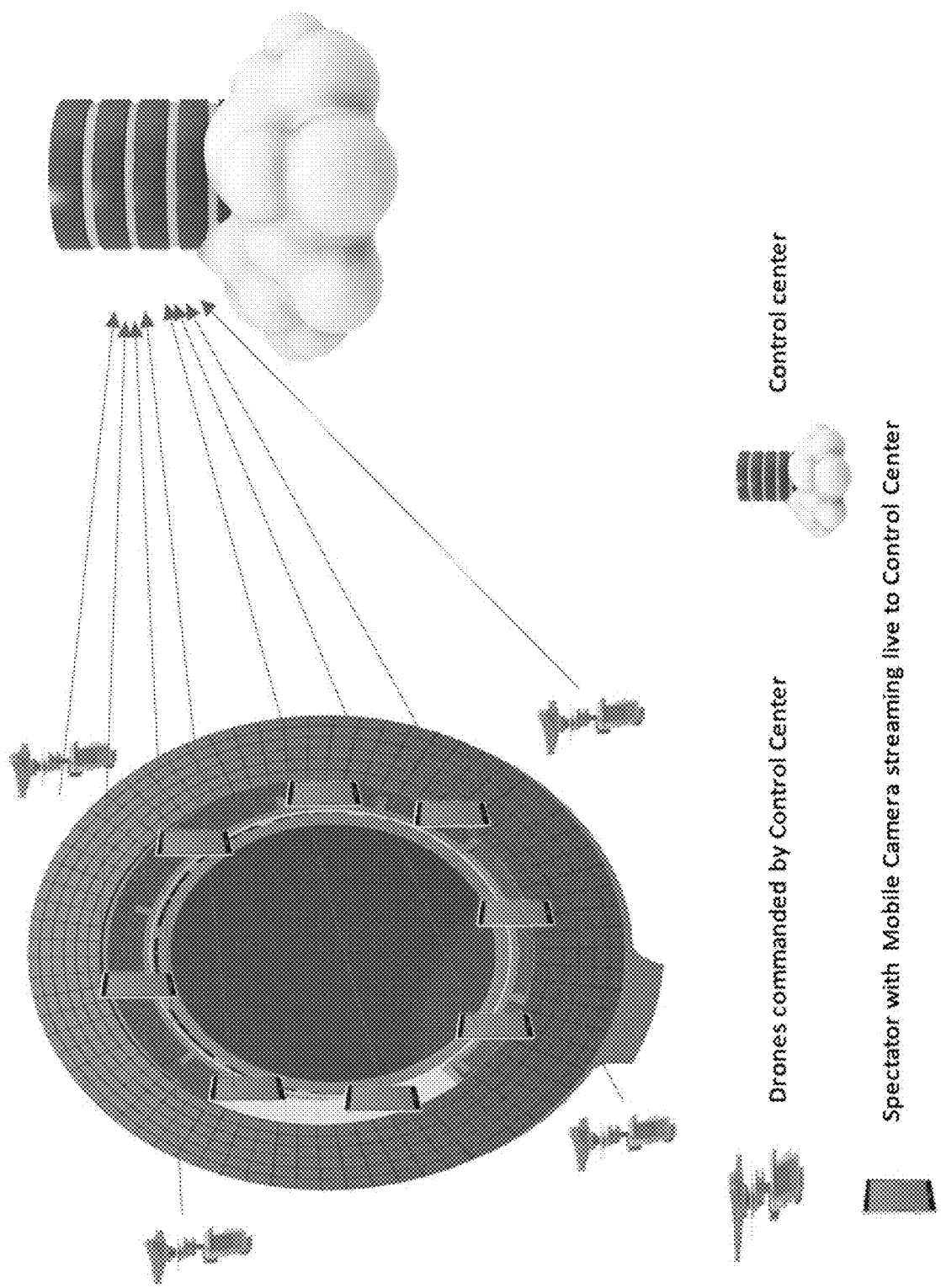
FIG. 21 depicts an exemplary process flow of the OMS in accordance with an aspect of the invention.

Now in reference to FIG. 21, a higher-view illustration of the OMS process, distilling the system, interaction, and process flow illustrated in FIG. 2-7, details the following system using ML/AI techniques to train a model to predict at least one of the SAM, color wheel, and/or OMS:

$$signature = W1*f1(body\_characteristics) + W2*f2(body\_posture) + W3*f3(agility) + W4*f4(bio\_metrics) + W5*f5(deviation)$$

In the above formula, body characteristics, body posture, agility, bio-metrics and deviation are the input variables.

f1, f2, f3, f4, f5 are the corresponding functions and W1, W2, W3, W4, W5 are the weights.

body characteristics:
1) manual user inputs—player(referenced as subject) can manually enter body characteristic in the toolkit/app height, weight, width, arm span and leg length.
2) derived from video frames—videos captured using depth sensing cameras can calculate dimensions of objects in the frame.

Otherwise, also if dimensions are known of at least one object in the frame before hand, dimensions of other objects can be approximately derived.

body posture:
Running Pose Estimation ML models (PoseNet/OpenPose/AlphaPose) on video frames can provide coordinates of subject's body joints.
Body alignment and posture can be derived from these coordinates and associated angles between those body joint points.

agility:
Agility is a function of speed/velocity and acceleration of various body part movements performed by the subject while playing.
1) From video frames: by applying object tracking, optical flow and pixel comparison algorithms on the video frames.
2) Wearable sensors: smart sensor devices attached to the subject body can track the body movements.

bio-metrics:
Smart sensor devices can track body temperature, heart rate, oxygen levels of the subject while playing.

deviation:
Deviation from textbook actions/shots/movements.
Subject's actions/shots are compared against a reference actions/shots from textbook library to calculate the deviation.

Both video and sensor data are collected by an ingestion system and all data inputs to functions are normalized before feeding to functions.

Output of functions are fed into a LSTM (Long Short Term Memory)/BiLSTM (Bi directional LSTM) RNN (Recurrent Nueral Network) mod& to predict the OMS value.

Not all inputs will have the same weightage for calculating the signature, hence we introduce difference weights W1, . . . W5 to influence the weightage of corresponding inputs on the calculated OMS.

Model is trained using large dataset of player's data to come up with right weight values and provide optimal OMS results.

Coaches can coach the subject/player better based on their OMS value.

As an extension of this idea, OMS of several players can be grouped together to come up with classification of player types.

Figure 18:
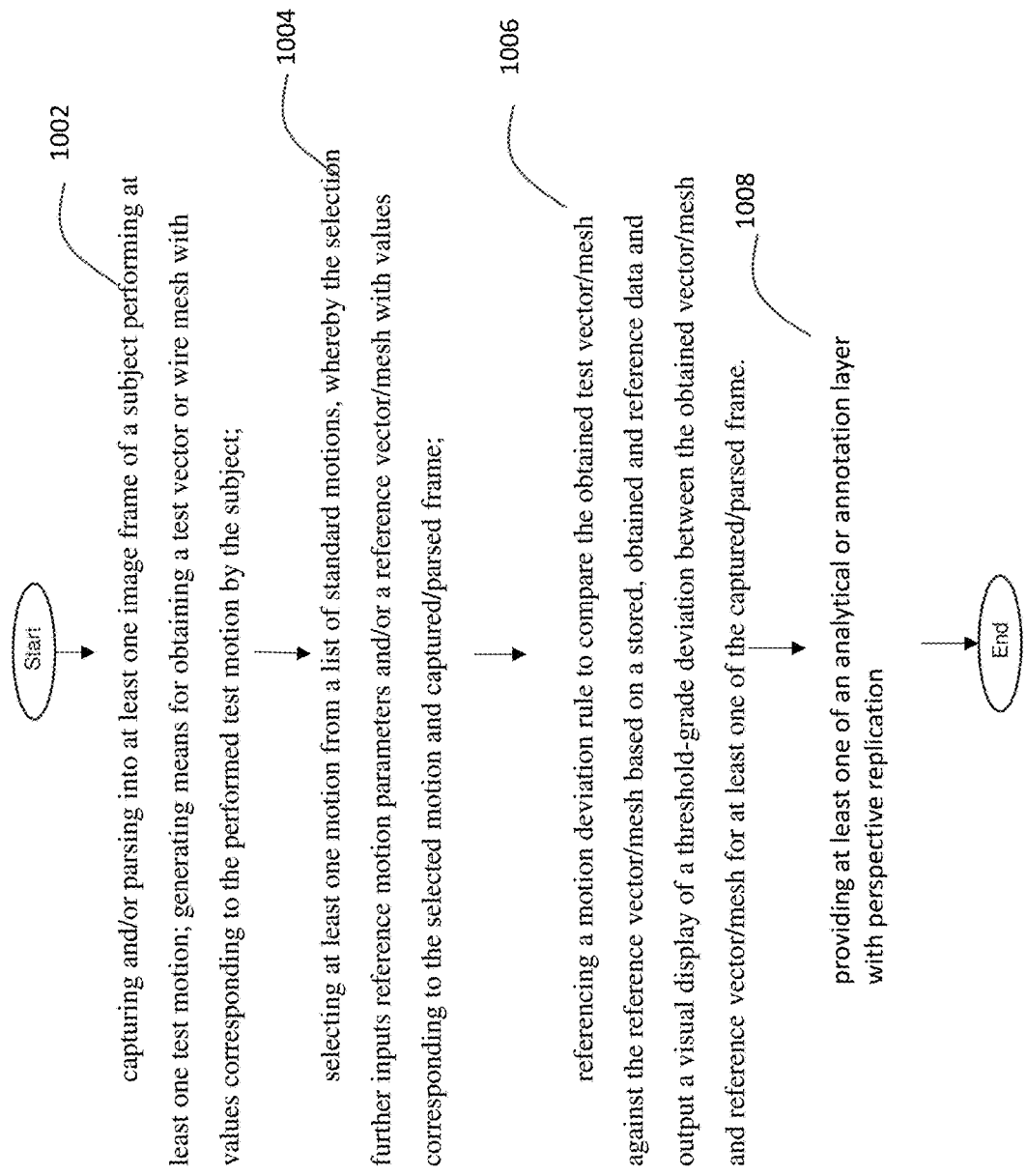
FIG. 18 depicts an exemplary method flow in accordance with an aspect of the invention.
Figure 19:
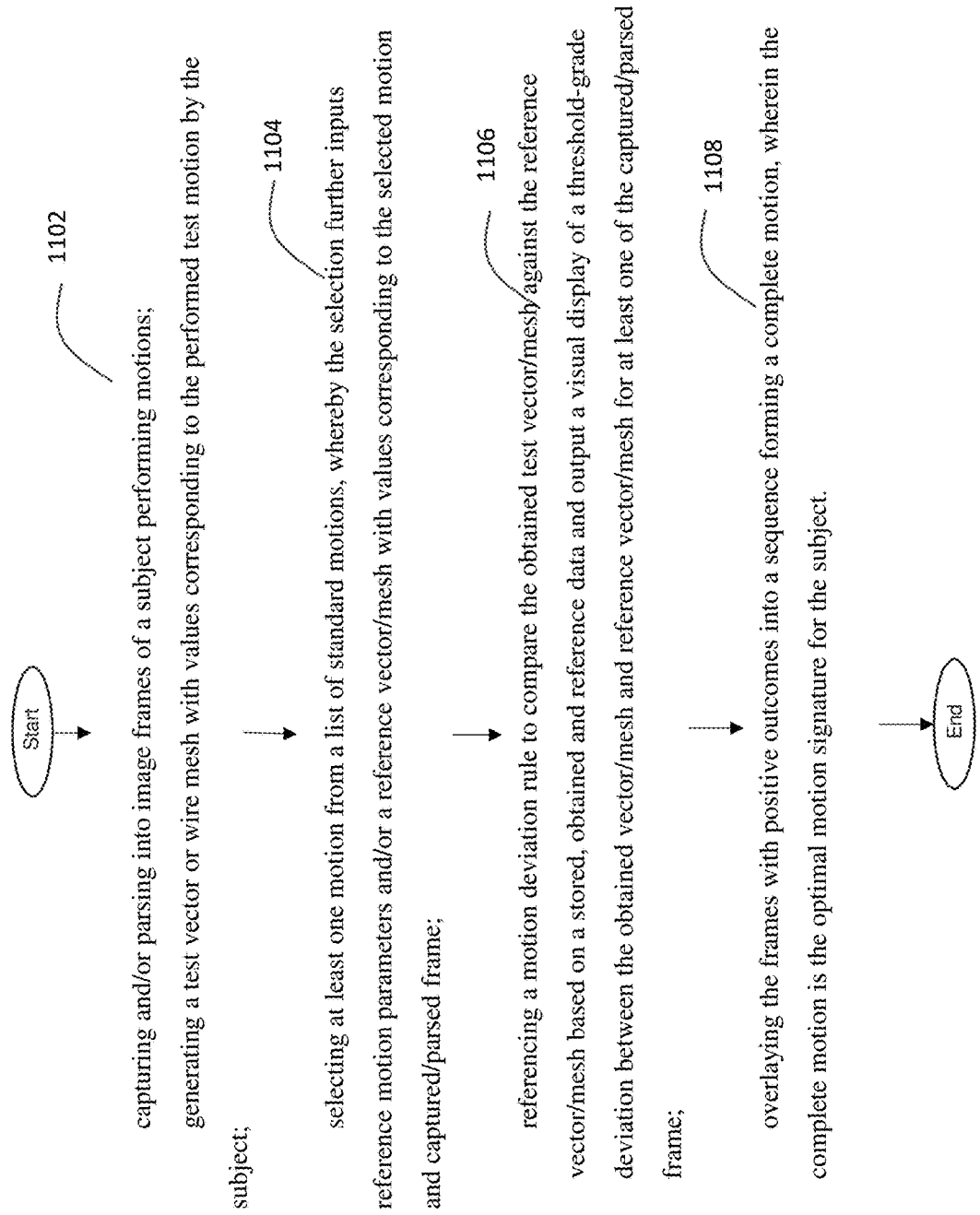
FIG. 19 depicts an exemplary method flow in accordance with an aspect of the invention.

Now in reference to FIGS. 16-19. FIGS. 16-19 illustrate exemplary method flow diagrams detailing the steps involved in generating the: surround annotation (FIG. 16); color wheel (FIG. 17); color wheel with analytics/perspective replication (FIG. 18); and optimal motion signature (FIG. 19). FIG. 16 describes the steps of generating a surround annotation entailing the steps of (1) capturing and/or parsing into at least one image frame of a subject performing at least one motion from each of at least three perspectives 802; (2) generating a test vector or wire mesh corresponding to a pose of the subject in each of the captured/parsed frame from each of the perspectives 804; and (3) inputting a drawing imposed on the test vector/mesh for a visual contrast against any one of a feature from the test vector/mesh from any one of the perspectives and replicating the annotation in all perspectives. Optionally, while not shown, a skeletal or fleshed wire mesh may be possible that is also configured for annotation and/or perspective annotation.

FIG. 17 describes the steps of generating a color wheel entailing the steps of: (1) capturing and/or parsing into at least one image frame of a subject performing at least one test motion 902; (2) generating means for obtaining a test vector or wire mesh with values corresponding to the performed test motion by the subject; selecting at least one motion from a list of standard motions, whereby the selection further inputs reference motion parameters and/or a reference vector/mesh with values corresponding to the selected motion and captured/parsed frame 904; (and 3) referencing a motion deviation rule to compare the obtained test vector/mesh against the reference vector/mesh based on a stored, obtained and reference data and output a visual display of a threshold-grade deviation between the obtained vector/mesh and reference vector/mesh for at least one of the captured/parsed frame 906.

FIG. 18 describes the steps of generating the color-wheel with the optional added step of providing an analytical and/or annotation layer 1008. Further yet, the layer may allow for perspective replication additionally. Finally, FIG. 19 describes the steps of generating an optimal motion signature: (1) capturing and/or parsing into image frames of a subject performing motions and generating a test vector or wire mesh with values corresponding to the performed test motion by the subject 1102; (2) selecting at least one motion from a list of standard motions, whereby the selection further inputs reference motion parameters and/or a reference vector/mesh with values corresponding to the selected motion and captured/parsed frame 1104; (3) referencing a motion deviation rule to compare the obtained test vector/mesh against the reference vector/mesh based on a stored, obtained and reference data and output a visual display of a threshold-grade deviation between the obtained vector/mesh and reference vector/mesh for at least one of the captured/parsed frame 1106; and (4) overlaying the frames with positive outcomes into a sequence forming a complete motion, wherein the complete motion is the optimal motion signature (OMS) for the subject.

Much like the skeletal/fleshed mesh, surround annotation, and the color wheel, the OMS may optionally be further configured for at least one of outputting an analytical layer or annotation based on a touch/tactile input or interface command—for at least a single frame for at least a single perspective.

All of the tools described herein ascribe to the belief that all training must be evidence based and all learning must be adaptive.

Evidence Based Training:
  BOTS and AI algorithms are used to provide insights for coaches based on how an athlete is learning. This helps coaches to introduce new concepts and skills based on the athlete learning curve. Evidence based training helps coaches to see when and how to introduce new concepts or skills.

Evaluation:
  Check each athlete in different areas of human motion.
  Walking, running and sprinting.
  Shooting, dribbling, and passing
  The locomotion speed scale is measured in a game play. The strength, power and speed interact to produce optimum acceleration, maximum speed and fatigue resistance graph is plotted to an Athlete. The AI program determines the gaps and mastery level and creates a personalized pathway to grow. The Skilltek framework tm (platform) powered by AI algorithms create custom SMART homework and activates drills and skills based on the athletes learning curve. Our algorithms evaluate the physical, mental and motor skills of an athlete based on age, grade and skill levels. The Skilltek platform powered by AI algorithms keeps track of athlete progression and learning patterns. The skilltek algorithms use visual, auditory or game play to track player progress.
  We do adaptive evaluation at age level, grade level, concept level, practice level and game level. We will identify the Athlete core problems and strengths. The Skilltek algorithm calibrates the data and define a custom-tailored pathway for every athlete to improve their talent.

Adaptive Learning Techniques
  The Algorithm identifies the athlete level of Fun and Challenge. Within the level of Fun and Challenge, the algorithm engages the athlete to practice at a range (sweet spot) to master the skill and get a sense of accomplishment. The AI program adapts to the learning curve of the athlete and teach/train at a level so to keep the athlete motivated rather than following a sequential training program.
  Algorithm/AI/Bots—Measure the behavioral and learning pattern of the athlete and start to engage in drills and routine and take them to the zone where we start to mend the athlete to improve his/her skill (talent) based on athlete learning curve. Personalized training programs are created to meet athletes ability to learn and skills are presented to athlete.

Process Steps
1. Capture the profile information.
2. Evaluate—Measure the athlete on the different area of the game.
  Testing on the areas of dribbling, passing, shooting, rebounding, defense, Footwork & Body Control, Passing & Receiving, Rebounding, Screening, Shooting, Team Defensive Concepts & Team Offensive Concepts.
3. Test mechanisms of the game backwards and forward to identify the missing bricks for all layers.
4. Present the concept in Audio and Video.
5. Feedback.
6. Scoring for each area.

Generating a Training Curriculum
1. Strand
2. Concept
3. Skill Level
4. Learning objections
5. Testing
6. Badge Embodiments are described at least in part herein with reference to flowchart illustrations and/or block diagrams of methods, systems, and computer program products and data structures according to embodiments of the disclosure. It will be understood that each block of the illustrations, and combinations of blocks, can be implemented by computer program instructions. These computer program instructions may be provided to a processor of a general-purpose computer, special purpose computer, or other programmable data processing apparatus to produce a machine such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus, to produce a computer implemented process such that, the instructions which execute on the computer or other programmable apparatus provide steps for implementing the functions/acts specified in the block or blocks.

In general, the word "module" as used herein, refers to logic embodied in hardware or firmware, or to a collection of software instructions, written in a programming language, such as, Java, C, etc. One or more software instructions in the unit may be embedded in firmware. The modules described herein may be implemented as either software and/or hardware modules and may be stored in any type of non-transitory computer-readable medium or other non-transitory storage elements. Some non-limiting examples of non-transitory computer-readable media include CDs, DVDs, BLU-RAY, flash memory, and hard disk drives.

In the drawings and specification, there have been disclosed exemplary embodiments of the disclosure. Although specific terms are employed, they are used in a generic and descriptive sense only and not for purposes of limitation, the scope of the invention being defined by the following claims. Those skilled in the art will recognize that the present invention admits of a number of modifications, within the spirit and scope of the inventive concepts, and that it may be applied in numerous applications, only some of which have been described herein. It is intended by the following claims to claim all such modifications and variations which fall within the true scope of the invention.

The invention claimed is:
1. A system for generating an optimal motion signature comprising:
  parsing received video into image frames of a subject performing a single complete motion, each with a positive or negative outcome, wherein the outcome is positive if resulting in an intended goal of the motion, and negative if failing to result in the intended goal;

a vector generating means for obtaining a test vector or wire mesh with values corresponding to the performed motion by the subject;

an input means for selecting at least one motion from a list of standard motions, whereby the selection further inputs reference motion parameters and/or a reference vector/mesh with values corresponding to the selected motion;

a memory element storing at least one of the reference motion parameters and/or vector/mesh corresponding to each of the listed motion, obtained test vector/mesh for the parsed frames with the positive outcomes;

a motion deviation module comparing the obtained test vector/mesh with positive outcome against the reference vector/mesh or reference motion parameters; and an optimal motion signature module to overlay the frames with positive outcomes into a sequence forming a single complete motion, wherein the single complete motion is further divided into motion segments, wherein segments deviated from the reference rely on a regression of the positive outcome frames to yield the optimal motion signature for that segment and un-deviated segments will rely on the reference as the optimal motion signature for any undeviated motion segments.

2. The system of claim 1, wherein the perspectives are captured from distinct image/video capture devices and are temporally aligned.

3. The system of claim 1, wherein the at least one captured/parsed frame from each of the perspectives are grouped for future reference and/or annotation.

4. The system of claim 1, wherein the annotation in a frame/pose in a first perspective is automatically replicated in the same corresponding frame/pose in a second perspective.

5. The system of claim 1, wherein the at least three frames capture a gather pose, load pose, or release pose during a basketball shooting motion.

6. The system of claim 1, wherein the at least three perspectives are a front view of the subject, a first side view of the subject, and a second side view of the subject opposing the first side.

7. The system of claim 1, further comprising a fourth perspective consisting of a rear view of the subject.

8. The system of claim 1, wherein the subject is at least one of a sports player or rehabilitating patient.

9. The system of claim 1, further comprising at least a portion of the capture being from an array of drones, each drone representing a different perspective.

10. The system of claim 1, wherein the image capture means is at least one of a mobile device, tablet, camera, stationed image/video capturing device.

11. The system of claim 1, wherein the vector generating means generates a wire mesh figure of the subject, wherein each wire of the wire mesh represents a distance and angle between vertices.

12. The system of claim 1, wherein the wire mesh is overlaid on an image of the subject.

13. The system of claim 1, further comprising a visual display output in the form of a color-coded deviation from the reference vector/mesh for at least one focused body part from any one of the parsed frame.

14. The system of claim 13, wherein the visual display output is a color-coded deviation from the reference vector/mesh for any focused body part for a captured video in real-time.

15. The system of claim 13, wherein the visual display output is further configured for annotation and/or sharing.

16. The system of claim 1, wherein the signature is at least one of further annotated, graphically overlaid, and/or shared.

17. The system of claim 1, wherein the optimal motion signature serves as a reference input for future motion analytics for the subject.

18. A method for generating an optimal motion signature comprising the steps of:

parsing a received video into frames of a subject performing at least a single complete motion;

generating a test vector or wire mesh with values corresponding to the performed motion by the subject;

selecting at least one motion from a list of standard motions, whereby the selection further inputs reference motion parameters and/or a reference vector/mesh with values corresponding to the selected;

comparing the obtained test vector/mesh against the reference vector/mesh and/or the reference motion parameters; and overlaying the frames with positive outcomes into a sequence forming a single complete motion, wherein the single complete motion is further divided into motion segments, wherein segments deviated from the reference rely on a regression of the positive outcome frames to yield the optimal motion signature for that segment and un-deviated segments will rely on the reference as the optimal motion signature for any undeviated motion segments.

19. A system for generating an optimal motion signature comprising:

parsing received images or video into frames of a subject performing a segment of a single motion resulting in a positive or negative outcome, wherein the outcome is positive if resulting in an intended goal of the motion, and negative if failing to result in the intended goal;

a vector generating means for obtaining a test vector or wire mesh with values corresponding to the performed motion segment by the subject;

a means to associate any one frame with a positive or negative outcome; and an optimal motion signature module to overlay the frames with positive outcomes into a sequence forming a single complete motion, wherein the single complete motion is the optimal motion signature for the subject.

* * * * *